US009537633B2

(12) United States Patent
Montojo et al.

(10) Patent No.: US 9,537,633 B2
(45) Date of Patent: Jan. 3, 2017

(54) METHOD AND APPARATUS FOR AGGREGATING CARRIERS OF MULTIPLE RADIO ACCESS TECHNOLOGIES

(75) Inventors: Juan Montojo, San Diego, CA (US); Jelena M. Damnjanovic, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 283 days.

(21) Appl. No.: 13/556,426

(22) Filed: Jul. 24, 2012

(65) Prior Publication Data

US 2013/0028117 A1    Jan. 31, 2013

Related U.S. Application Data

(60) Provisional application No. 61/513,187, filed on Jul. 29, 2011.

(51) Int. Cl.
*H04L 5/00* (2006.01)
*H04W 72/04* (2009.01)
(Continued)

(52) U.S. Cl.
CPC .......... *H04L 5/0053* (2013.01); *H04L 5/001* (2013.01); *H04W 72/0413* (2013.01); *H04W 72/1215* (2013.01); *H04W 74/004* (2013.01)

(58) Field of Classification Search
CPC ... H04L 5/003–5/0035; H04L 5/0048–5/0057; H04L 5/02–5/12; H04L 5/0091–5/0098; H04L 5/14–5/143; H04L 5/1469–5/1492; H04W 72/04–72/042; H04W 72/044–72/0453; H04W 72/048–72/10; H04W 72/1215; H04W 72/1278–72/1289; H04W 74/002–74/008
(Continued)

(56) References Cited

U.S. PATENT DOCUMENTS

2010/0098012 A1    4/2010  Bala et al.
2010/0272064 A1    10/2010 Chen
(Continued)

FOREIGN PATENT DOCUMENTS

JP    2005/500760 A    1/2005
JP    2012/506671 A    3/2012
(Continued)

OTHER PUBLICATIONS

International Search Report and Written Opinion—PCT/US2012/048132—ISA/EPO—Oct. 26, 2012.
(Continued)

*Primary Examiner* — Michael Thier
*Assistant Examiner* — Eric Myers
(74) *Attorney, Agent, or Firm* — Arent Fox LLP

(57) ABSTRACT

The described aspects include methods and apparatus for communicating control information in a carrier aggregation configuration that uses multiple radio access technologies (RAT). A first resource assignment related to a first carrier corresponding to a first RAT can be received, as well as, a second resource assignment related to a second carrier corresponding to a second RAT. The first carrier and the second carrier are aggregated for communicating data in a wireless network. In addition, resources can be determined for communicating first RAT control data for the first RAT over an uplink carrier based at least in part on the first resource assignment. Second RAT control data can then also
(Continued)

be communicated in containers and/or using timing for control data of the first RAT over at least a portion of the resources.

59 Claims, 18 Drawing Sheets

(51) Int. Cl.
*H04W 72/12* (2009.01)
*H04W 74/00* (2009.01)

(58) Field of Classification Search
USPC ........ 370/252, 328–337, 345, 347–348, 436, 370/438–439, 442–444, 458, 465–468, 370/478, 498, 522, 524, 537–544
See application file for complete search history.

(56) References Cited

U.S. PATENT DOCUMENTS

| | | |
|---|---|---|
| 2011/0044218 A1 | 2/2011 | Kaur et al. |
| 2011/0065446 A1 | 3/2011 | Mueck et al. |
| 2011/0128919 A1 | 6/2011 | Kim et al. |
| 2011/0134831 A1* | 6/2011 | Pirskanen ............... H04L 5/001 370/328 |
| 2011/0268048 A1 | 11/2011 | Toskala et al. |
| 2012/0093073 A1* | 4/2012 | Lunttila et al. ................ 370/328 |
| 2012/0230219 A1* | 9/2012 | Pettersson et al. ........... 370/252 |
| 2013/0343357 A1* | 12/2013 | Lindoff et al. ................ 370/336 |

FOREIGN PATENT DOCUMENTS

| | | |
|---|---|---|
| WO | WO-03/017689 A1 | 2/2003 |
| WO | WO-2010/048142 A1 | 4/2010 |
| WO | 2011072721 A1 | 6/2011 |
| WO | WO-2012/061734 A2 | 5/2012 |
| WO | WO-2012/122170 A1 | 9/2012 |

OTHER PUBLICATIONS

Nokia Siemens Networks, Nokia, "Aggregating HSPDA and LTE carriers", 3GPP TSG-RAN WG1 Meeting #64 R1-111060, Feb. 25, 2011, pp. 3, URL, http://www.3grpp.org./ftp.tsg_ran/WG1_RL1/TSGR1_64/Docs/R1-111060.zip.

European Search Report—EP15202138—Search Authority—The Hague—Apr. 7, 2016. 8 Total Pages.

* cited by examiner

METHOD AND APPARATUS FOR AGGREGATING CARRIERS OF MULTIPLE RADIO ACCESS TECHNOLOGIES

CLAIM OF PRIORITY UNDER 35 U.S.C. §119

The present Application for Patent claims priority to Provisional Application No. 61/513,187, entitled "METHOD AND APPARATUS FOR AGGREGATING CARRIERS OF MULTIPLE RADIO ACCESS TECHNOLOGIES," filed Jul. 29, 2011, assigned to the assignee hereof and hereby expressly incorporated by reference herein.

BACKGROUND

Field

The following description relates generally to wireless network communications, and more particularly to carrier aggregation.

Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP) (e.g., 3GPP LTE (Long Term Evolution)/LTE-Advanced), ultra mobile broadband (UMB), evolution data optimized (EV-DO), etc.

Generally, wireless multiple-access communication systems may simultaneously support communication for multiple mobile user equipment (UE). Each UE may communicate with one or more evolved Node B (eNB) via transmissions on forward and reverse links. The forward link (or downlink) refers to the communication link from eNB to UE, and the reverse link (or uplink) refers to the communication link from UE to eNB. Further, communications between UE and eNB may be established via single-input single-output (SISO) systems, multiple-input single-output (MISO) systems, multiple-input multiple-output (MIMO) systems, and so forth.

UEs can communicate with eNBs using one or more radio access technologies (RAT), such as LTE, high speed packet access (HSPA), universal mobile telecommunication system (UMTS), and/or similar technologies or variants thereof. Some UEs can switch among RATs when communicating with given base stations to achieve diversity in network operability. In addition, carrier aggregation (CA) is developing to allow a UE to communicate with one or more eNBs over one or more component carriers (CC). This can improve throughput at the UE and/or allow the UE to receive multiple simultaneous services from various nodes. In one CA scheme, a UE can establish carriers with multiple serving cells, and can have a primary CC (PCC) with an eNB or related cell, which can be referred to as the primary cell (PCell), and one or more secondary CCs (SCC) with the same or other eNBs or cells, which can be referred to as secondary cells (SCell). The PCC or PCell can be used for communicating control data related to all CCs.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, the present disclosure describes various aspects in connection with aggregating carriers of multiple radio access technologies (RAT). In particular, multiple downlink carriers can be assigned to a user equipment (UE) or other device communicating with an evolved Node B (eNB) or other access point. For example, each carrier can be established with a different cell of the eNB or cells of other eNBs. To conserve resources and processing required at the UE, however, a lesser number of uplink carriers can be provided (e.g., a single uplink carrier). In some cases, downlink carriers of different RATs can be assigned the same related uplink carrier. Thus, data related to one RAT of a downlink carrier can be communicated using containers, timing, etc. of another RAT of another downlink carrier where the downlink carriers share an uplink carrier.

In one example, a method for communicating control information in a carrier aggregation configuration is provided. The method includes receiving a first resource assignment related to a first carrier corresponding to a first RAT and receiving a second resource assignment related to a second carrier corresponding to a second RAT, wherein the first carrier and the second carrier are aggregated for communicating data in a wireless network. The method further includes determining resources for communicating first RAT control data for the first RAT over an uplink carrier based at least in part on the first resource assignment, and communicating second RAT control data in containers for control data of the first RAT over at least a portion of the resources.

In another aspect, an apparatus for communicating control information in a carrier aggregation configuration is provided. The apparatus includes means for receiving a first resource assignment related to a first carrier corresponding to a first RAT and receiving a second resource assignment related to a second carrier corresponding to a second RAT, wherein the first carrier and the second carrier are aggregated for communicating data in a wireless network. The apparatus further includes means for determining resources for communicating first RAT control data for the first RAT over an uplink carrier based at least in part on the first resource assignment and means for communicating second RAT control data in containers for control data of the first RAT over at least a portion of the resources.

Still, in another aspect, a computer-program product for communicating control information in a carrier aggregation configuration is provided including a computer-readable medium having code for causing at least one computer to receive a first resource assignment related to a first carrier corresponding to a first RAT and code for causing the at least one computer to receive a second resource assignment related to a second carrier corresponding to a second RAT, wherein the first carrier and the second carrier are aggregated for communicating data in a wireless network. The computer-readable medium further includes code for causing the at least one computer to determine resources for communicating first RAT control data for the first RAT over an uplink carrier based at least in part on the first resource assignment and code for causing the at least one computer to communicate second RAT control data in containers for control data of the first RAT over at least a portion of the resources.

In yet another aspect, an apparatus for communicating control information in a carrier aggregation configuration is provided including a processor and a memory in electronic communication with the processor. The apparatus further includes instructions stored in the memory executable by the processor to receive a first resource assignment related to a first carrier corresponding to a first RAT, and receive a second resource assignment related to a second carrier corresponding to a second RAT, wherein the first carrier and the second carrier are aggregated for communicating data in a wireless network. The instructions are further executable by the processor to determine resources for communicating first RAT control data for the first RAT over an uplink carrier based at least in part on the first resource assignment and communicate second RAT control data in containers for control data of the first RAT over at least a portion of the resources.

Moreover, in an aspect, an apparatus for communicating control information in a carrier aggregation configuration is provided. The apparatus includes a carrier assignment receiving component for receiving a first resource assignment related to a first carrier corresponding to a first RAT and receiving a second resource assignment related to a second carrier corresponding to a second RAT, wherein the first carrier and the second carrier are aggregated for communicating data in a wireless network. The apparatus further includes a control resource determining component for determining resources for communicating first RAT control data for the first RAT over an uplink carrier based at least in part on the first resource assignment and a control data communicating component for communicating second RAT control data in containers for control data of the first RAT over at least a portion of the resources.

In one example, a method for assigning carriers to one or more devices in a wireless network is provided. The method includes assigning a first set of resources related to a first carrier of a first RAT to a UE and assigning a second set of resources related to a second carrier of a second RAT to the UE. The method further includes receiving control data for the second set of resources in containers for control data of the first RAT over resources of an uplink carrier assigned for communicating control data of the first RAT.

In another aspect, an apparatus for assigning carriers to one or more devices in a wireless network is provided. The apparatus includes means for assigning a first set of resources related to a first carrier of a first RAT to a UE and assigning a second set of resources related to a second carrier of a second RAT to the UE. The apparatus further includes means for receiving control data for the second set of resources in containers for control data of the first RAT over resources of an uplink carrier assigned for communicating control data of the first RAT.

Still, in another aspect, a computer-program product for assigning carriers to one or more devices in a wireless network is provided including a computer-readable medium having code for causing at least one computer to assign a first set of resources related to a first carrier of a first RAT to a UE and code for causing the at least one computer to assign a second set of resources related to a second carrier of a second RAT to the UE. The computer-readable medium further includes code for causing the at least one computer to receive control data for the second set of resources in containers for control data of the first RAT over resources of an uplink carrier assigned for communicating control data of the first RAT.

In yet another aspect, an apparatus for assigning carriers to one or more devices in a wireless network is provided including a processor and a memory in electronic communication with the processor. The apparatus further includes instructions stored in the memory executable by the processor to assign a first set of resources related to a first carrier of a first RAT to a UE and assign a second set of resources related to a second carrier of a second RAT to the UE. The instructions are further executable by the processor to receive control data for the second set of resources in containers for control data of the first RAT over resources of an uplink carrier assigned for communicating control data of the first RAT.

Moreover, in an aspect, an apparatus for assigning carriers to one or more devices in a wireless network is provided. The apparatus includes a carrier assigning component for assigning a first set of resources related to a first carrier of a first RAT to a UE and assigning a second set of resources related to a second carrier of a second RAT to the UE. The apparatus further includes a control data receiving component for receiving control data for the second set of resources in containers for control data of the first RAT over resources of an uplink carrier assigned for communicating control data of the first RAT.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
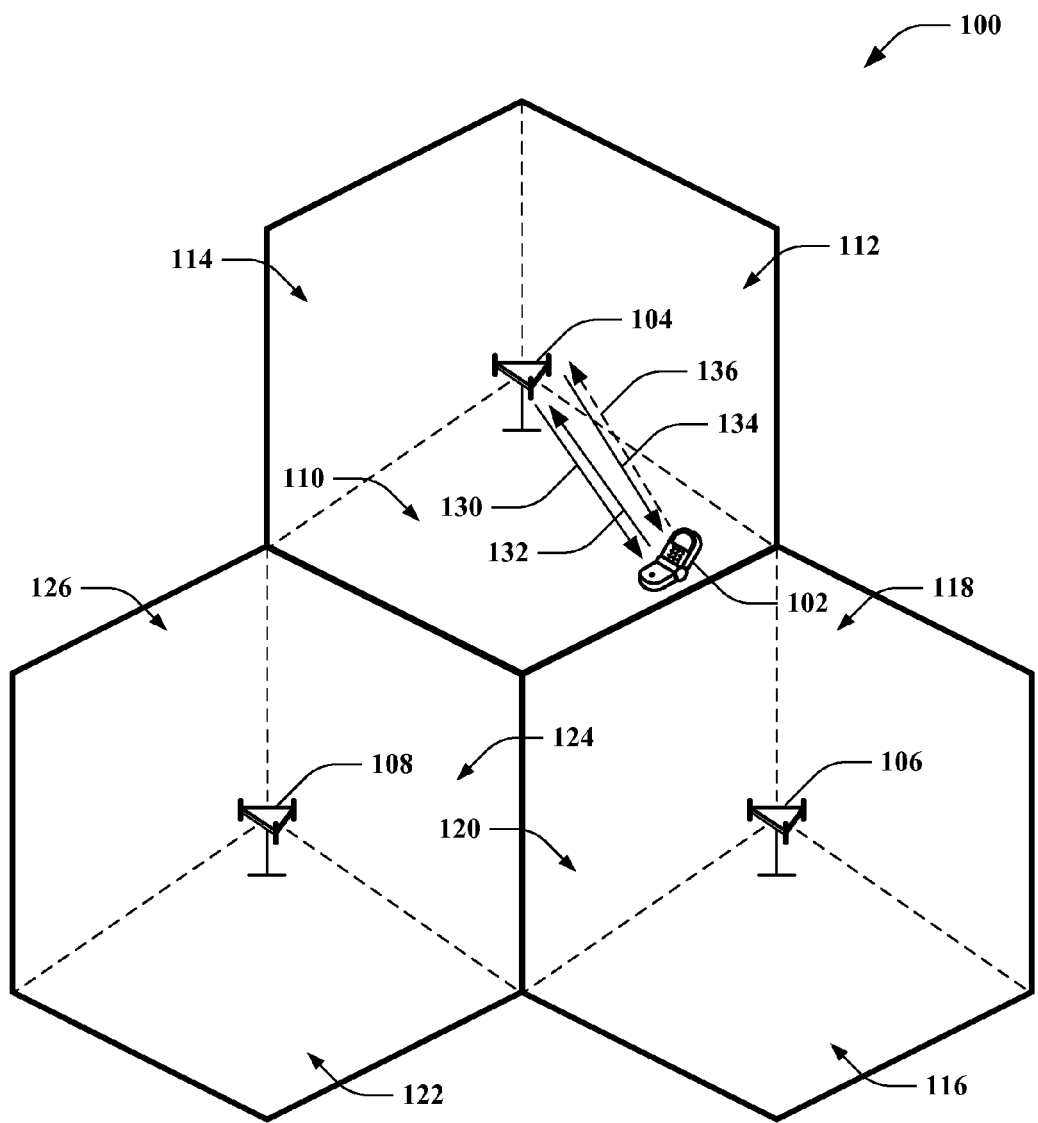
FIG. 1 illustrates an example system for providing communication over multiple carriers.
Figure 1:
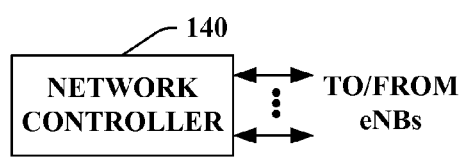

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Described herein are various aspects related to carrier aggregation using multiple radio access technologies (RAT). For example, a user equipment (UE) or other wireless device can receive assignment of, or otherwise establish, one or more component carriers (CC) of a RAT with an evolved Node B (eNB), or other access point, in a cell thereof. The UE can also establish one or more other CCs of a different RAT in the same or different cell of the same or different eNB. In some scenarios, each downlink CC can have a corresponding uplink CC. In other scenarios, one or more downlink CCs can share an uplink CC to minimize processing time, conserve power and resources, etc. at the UE. In this example, data related to a downlink CC of a RAT can be communicated over an uplink CC using containers, timing, etc. of another RAT that shares the uplink CC.

In a specific carrier aggregation (CA) example, a UE can establish a primary CC (PCC) in a cell of an eNB, which can also be referred to as a primary cell (PCell), and one or more secondary CCs (SCC) in one or more cells of the same or another eNB, which can also be referred to as a secondary cell (SCell). The PCell and SCell can utilize different RATs for providing wireless network access. In this example, the UE can communicate control information corresponding to all cells with the PCell, while receiving control data, channel assignments, channel communications, etc. over the respective PCell and SCell(s).

Though generally described herein with respect to multiple downlink CCs sharing a single uplink CC (or a lesser number of uplink CCs), it is to be appreciated that the concepts can also be applied to a plurality of uplink CCs sharing a single downlink CC (or a lesser number of downlink CCs).

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 illustrates an example wireless communication system 100 for providing CA in network communications. System 100 includes a UE 102 that is served by one or more cells of one or more eNBs 104, 106, and 108. In the depicted example, eNB 104 provides multiple cells 110, 112, and 114, eNB 106 provides multiple cells 116, 118, and 120, and eNB 108 provides multiple cells 122, 124, and 126. Though shown substantially as macro node coverage, it is to be appreciated that system 100 can include one or more femto nodes, relays, etc., as well that can provide additional cells, which can be deployed within one or more cells of eNBs 104, 106, 108 in one example, for serving one or more UEs. In addition, system 100 includes a network controller 140 that can facilitate communication between the eNBs 104, 106, and 108, and one or more other components, such as components of a core wireless network. It is to be appreciated that UE 102 can be substantially any device capable of communicating with one or more components of a wireless network, such as a mobile or stationary terminal, a modem (or other tethered device), a portion thereof, and/or the like. In addition, eNBs 104, 106, and 108 can be substantially any base station that can communicate with one or more UEs or other devices in a wireless network, such as a macro node, femto node, pico node, mobile base station, relay node, UE (e.g., communicating in peer-to-peer or ad-hoc mode with UE 102), a portion thereof, and/or the like.

In an example, UE 102 can be served by cells 110 and 112 over respective CCs 130, 132, 134, and optionally 136 in CA. In one example, UE 102 and eNB 104 can establish carrier 130 as a downlink PCC in cell 110, which can be referred to as the PCell, and carrier 132 as an uplink PCC. In addition, UE 102 and eNB 104 can establish carrier 134 as a downlink SCC in cell 112, which can be referred to as an SCell, and can optionally establish carrier 136 as an uplink SCC. It is to be appreciated that UE 102 can establish downlink and/or uplink SCCs with other SCells as well, in one example. UE 102 can communicate user-plane (non-control) data over substantially all established CCs 130, 132, 134, and/or 136, and can receive control data over the downlink CCs 130 and 134. UE 102 can also communicate control data to eNB 104 over uplink PCC 132, but may or may not establish or utilize uplink SCC 136 for communicating control data (or other uplink data) in an effort to conserve transmission resources and power at UE 102.

Thus, in an example, UE 102 can use uplink PCC 132 for communicating control data related to downlink CCs 130 and 134 (and/or other downlink CCs). It is to be appreciated that UE 102 can use uplink PCC 132 to communicate uplink user-plane data for downlink CCs 130 and 134 as well, in one example. Moreover, in an example, eNB 104 can communicate using different RATs in each of cells 110 and 112 (e.g., LTE in cell 110 and HSPA in cell 112). This can introduce additional complexities with respect to communicating control data for both cells over uplink PCC 132. Thus, in an example, containers, timing, etc. related to the RAT of the uplink PCC 132 can be used to communicate control data for DL PCC 130 and DL SCC 134.

Figure 2:
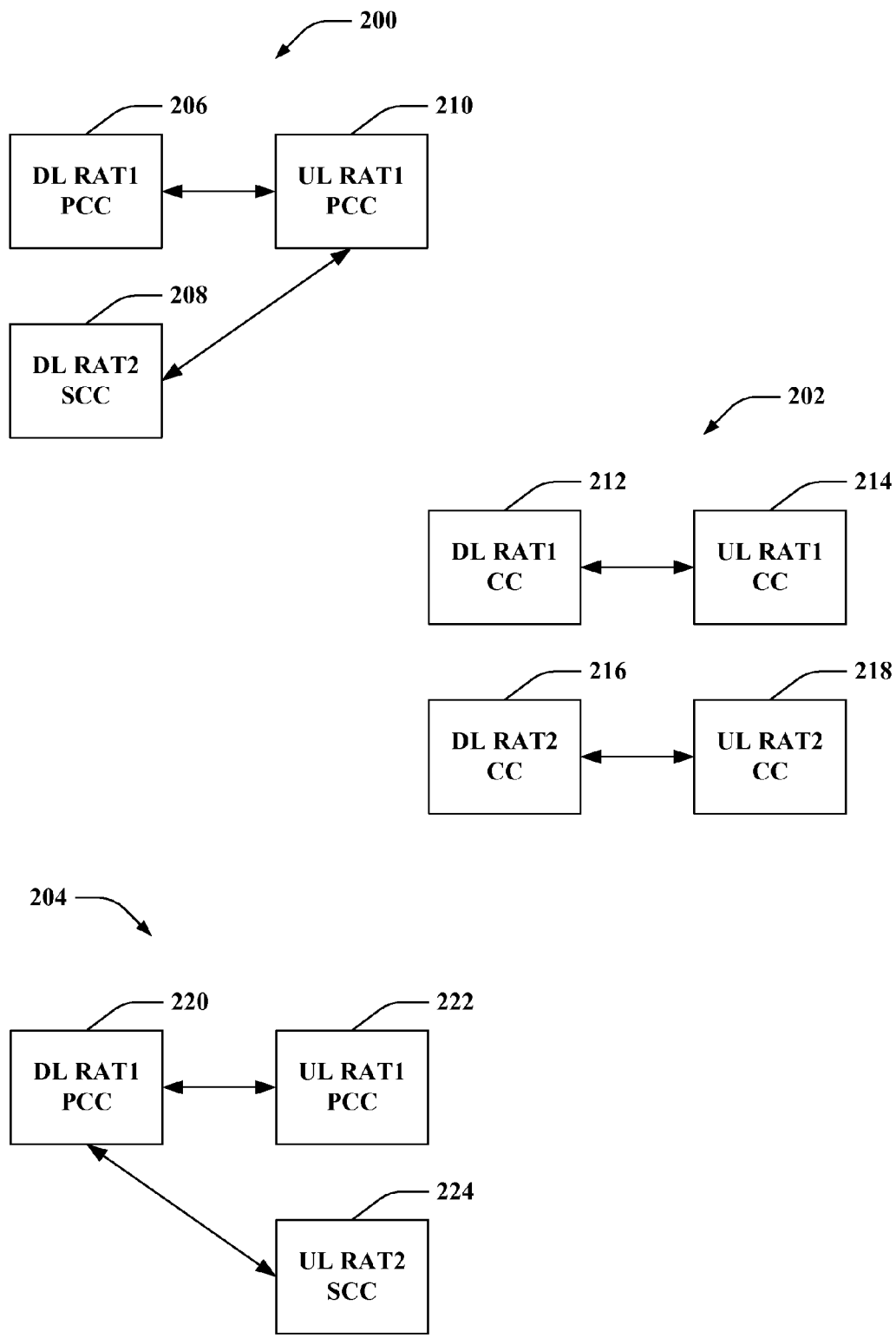
FIG. 2 illustrates example component carrier (CC) configurations in carrier aggregation (CA).

FIG. 2 illustrates example carrier configurations 200, 202, and 204 for a UE. Carrier configuration 200 includes a downlink (DL) RAT1 carrier 206 corresponding to a PCell, which can also be referred to as a PCC as described above, and a DL RAT2 carrier 208 corresponding to a SCell, which can also be referred to as a SCC. The PCell and SCell can be provided by one or more eNBs, as described. For example, the UE can be assigned DL RAT1 PCC 206 from the PCell for receiving data from the PCell over a first RAT, and DL RAT2 SCC 208 from the SCell for receiving data from the SCell over a second RAT. The UE can additionally establish, be assigned, or otherwise determine an uplink (UL) RAT1 PCC 210 from the PCell. In one example, a UE can determine the UL RAT1 PCC 210 or related resources based at least in part on resources corresponding to the DL RAT1 PCC 206, resources received during assignment or establishment of DL RAT1 PCC 206, resources otherwise indicated by the PCell or related eNB, etc.

Moreover, as described, the UL RAT1 PCC 210 can be linked to both DL RAT1 PCC 206 and DL RAT2 SCC 208 for communicating control data related thereto. Thus, in some cases, the control data related to RAT2 is communicated over uplink resources related to RAT1. In this example, RAT2 control data can be adapted for communicating over the UL RAT1 PCC 210. For example, this can include utilizing a processing time for communicating the RAT2 control data that is different for that defined by RAT2 but compatible with the RAT1. For example, the processing time can correspond to a length of time between receiving a communication over a downlink carrier in a RAT and transmitting feedback for the communication. Thus, an eNB of a RAT can expect to receive feedback (e.g., retransmission feedback, channel quality or reference signal feedback, etc.) for a given communication within the processing time, and the processing time can vary among different RATs. The processing time in RAT1 for UL RAT1 PCC 210 to communicate control data of RAT2, in this example, can be selected to minimize the difference from that defined by RAT2. In another example, adapting the RAT2 control data can include utilizing a RAT1 container (e.g., a control channel of the RAT) to communicate the RAT2 control data (e.g., and/or using a periodicity, timing offset, etc. relating to RAT1). In one specific example, RAT1 can be LTE, and RAT2 can be HSPA, as described in further detail herein. Aspects described herein can apply to this carrier configuration 200.

Carrier configuration 202 includes a DL RAT1 CC 212 with a corresponding UL RAT1 CC 214. Thus, in this example, control data related to the DL RAT1 CC 212 can generally be transmitted over the corresponding UL RAT1 CC 214. Similarly, carrier configuration 202 includes a DL RAT2 CC 216 that has a corresponding UL RAT2 CC 218. Thus, control data related to DL RAT2 CC 216 can be communicated over the corresponding UL RAT2 CC 218. Thus, no PCC or SCC distinction is used because the control data related to a given downlink CC can be communicated over the corresponding uplink CC. The UL RAT1 CC 214 and UL RAT2 CC 218 can be determined based at least in part on the DL RAT1 CC 212 and DL RAT2 CC 216 resources, respectively, or resources received during assignment thereof, etc., as described.

Another possible carrier configuration 204 includes a DL RAT1 PCC 220 and a corresponding UL RAT1 PCC 222. In addition, the UE can be assigned another UL carrier of a different RAT, UL RAT2 SCC 224. In this example, the UE can receive carrier assignments for UL CCs of different RATs (e.g., UL RAT1 PCC 222 and UL RAT2 SCC 224) from the DL RAT1 PCC 220. Similarly, it is to be appreciated that control data related to UL RAT1 PCC 222 and UL RAT2 SCC 224 can be communicated over DL RAT1 PCC 220 using timing, containers, etc. of RAT1, as described above.

Figure 3:
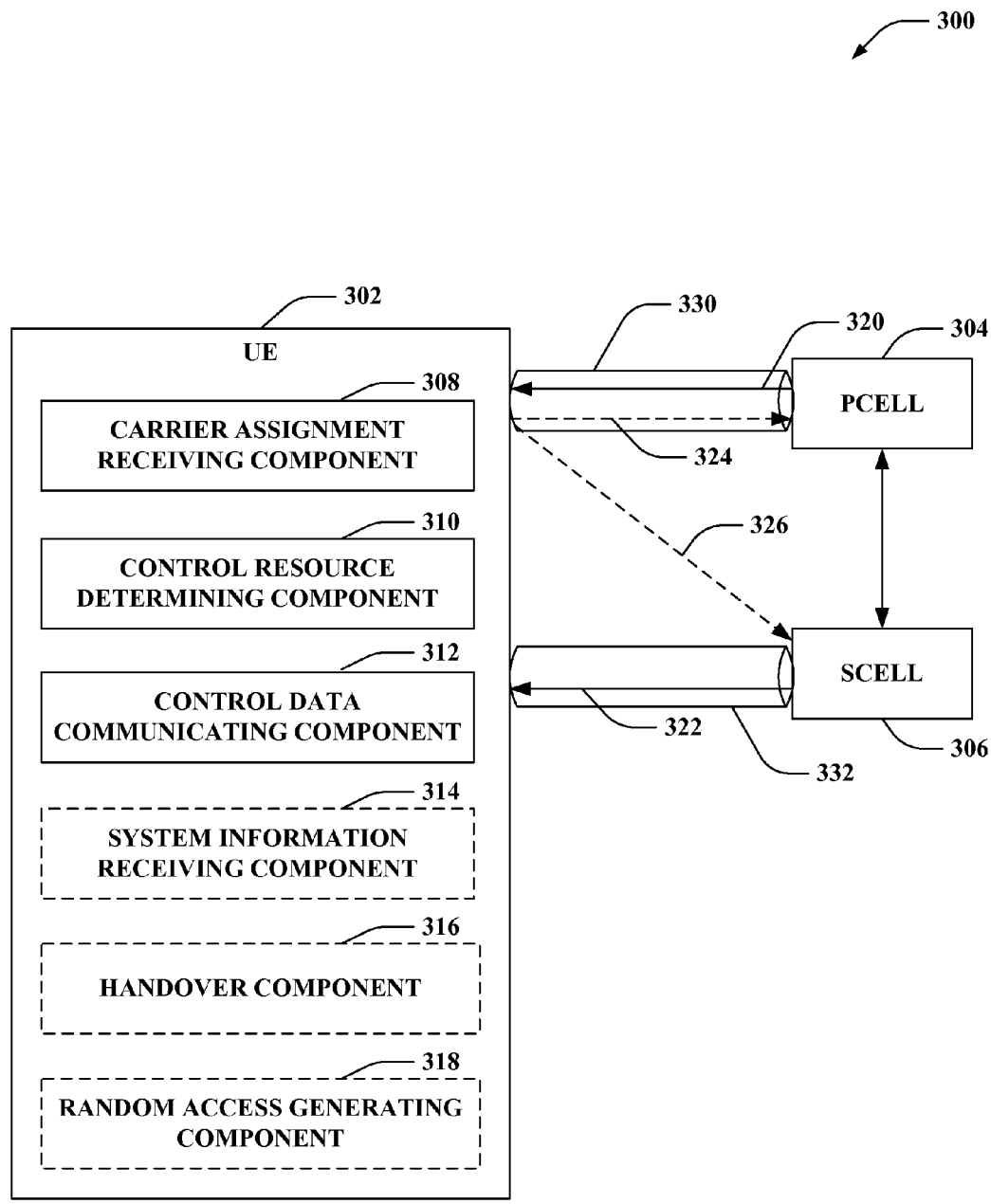
FIG. 3 illustrates an example system for communicating control data of one radio access technology (RAT) over a CC of another RAT.

FIG. 3 illustrates an example system 300 for receiving multiple carrier assignments in CA. System 300 includes a UE 302 that can communicate with one or more eNBs in cells 304 and/or 306 provided by the eNBs. For example, UE 302 can be assigned resources in the one or more cells 304 and/or 306 in the form of one or more CCs for communicating therewith using a RAT. UE 302 can be substantially any device that communicates in a wireless network, such as a mobile terminal, a stationary terminal, a modem (or other tethered device), a portion thereof, and/or the like. Cells 304 and 306 can be provided by one or more eNBs, and reference to PCell 304 and SCell 306 is used herein to also refer to eNBs providing the cells. Such eNBs can each be a macro node, femto node, pico node, etc., a mobile base station, a relay node, a UE communicating in peer-to-peer or ad-hoc mode with UE 302, a portion thereof, and/or the like.

UE 302 includes a carrier assignment receiving component 308 for obtaining CC assignments from PCell 304, SCell 306, and/or related eNBs, which can be aggregated CC assignments, a control resource determining component 310 for determining control resources, such as one or more CCs and/or related timing or other resources, over which to communicate control data for at least one of the CCs, and a control data communicating component 312 for communicating control data over the control resources. UE 302 can also optionally include a system information receiving component 314 for obtaining system information (e.g., system information blocks (SIB) in LTE) broadcasted in one or more cells (e.g., from one or more eNBs), a handover component 316 for performing one or more functions related to handing over communications to another cell or related eNB (e.g., generating measurement reports, receiving a handover command, etc.), and/or a random access generating component 318 for requesting access to one or more eNBs over a random access channel (RACH).

According to an example, PCell 304 can assign a PCC 330 related to a RAT (RAT1) to UE 302. Carrier assignment receiving component 308 can obtain the assignment 320 of the PCC 330 and can receive communications from PCell 304 over PCC 330. Similarly, SCell 306 can assign a SCC 332 related to another RAT (RAT2) to UE 302, and carrier assignment receiving component 308 can similarly obtain the assignment 322 and receive communications from SCell 306 over SCC 332. In addition, control resource determining component 310 can determine an uplink carrier and/or related resources for communicating RAT1 control data related to a downlink portion of PCC 330 to PCell 304. For example, control resource determining component 310 can determine an uplink portion of PCC 330 based at least in part on resources relating to the downlink portion, as received in assignment 320, a received indication of resources that can be used to communicate control data related to the downlink portion, and/or the like. In any case, control resource determining component 310 can determine to communicate RAT2 control data 324 related to SCC 332 over the uplink portion of the PCC 330 as well, as described above. Thus, control data communicating component 312 can communicate the control data (or other uplink data) related to both carriers over PCC 330. As described, this can include adapting RAT2 control data for transmission over the RAT1 PCC 330.

For example, control resource communicating component 312 can utilize a processing time that corresponds to a processing time compatible with RAT1 for communicating RAT2 control data over an uplink portion of the PCC 330 related to RAT1. For example, control resource communicating component 312 can select the processing time to minimize a difference to the processing time defined for RAT2. In one example, timing for RAT1 and RAT2 may not align, and thus control resource determining component 310 can select the processing time, for use by control data communicating component 312 in communicating RAT2 control data over RAT1 resources, to be slightly less than or slightly greater than that defined for the RAT2.

Figure 5:
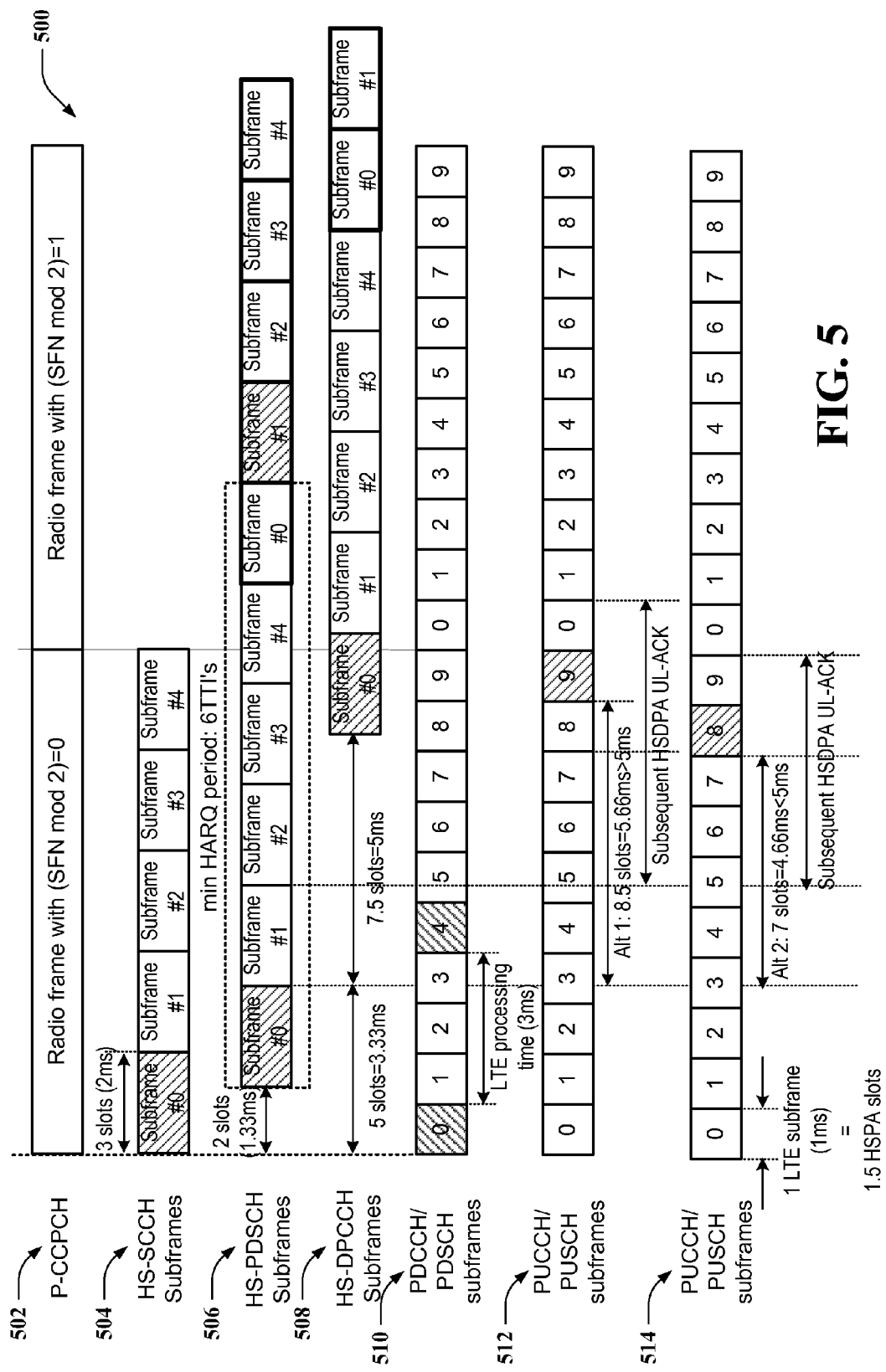
FIGS. 5-6 illustrate example timelines for long term evolution (LTE) and high speed packet access (HSPA) communications.

In a specific example, RAT1 can be LTE, and RAT2 can be HSPA. For instance, the HSPA control data can correspond to retransmission feedback for HSPA, such as hybrid automatic repeat/request (HARQ) feedback. In this example, and as further depicted in FIG. 5, UL acknowledgement (ACK) transmission for HSPA can take place 7.5 (5 ms) slots after the end of a corresponding HSPA data transmission, which can be 5 slots (3.33 ms) from the start of a frame or other point of reference. In one example, control resource determining component 310 can select a processing time of 8.5 slots (5.66 ms) from the end of the HSPA data transmission, which aligns to an LTE subframe for communicating HSPA uplink ACK 324 related to SCC 332 over LTE PCC 330. In another example, control resource determining component 310 can select a processing time of 7 slots (4.66 ms) from the end of the HSPA data transmission, which aligns to an prior LTE subframe for communicating HSPA uplink ACK 324 related to SCC 332 over LTE PCC 330. Both examples are depicted in FIG. 5, which shows alignment of various frames relating to LTE and HSPA channels. In either example, the selected processing time can be selected to remain near the 5 ms uplink ACK transmission time in HSPA.

Using 8.5 slots can result in timing of UL ACK for HSPA in odd numbered LTE subframes, while 7 slots can result in timing of UL ACK for HSPA in even numbered LTE subframes. Furthermore, in an example, control resource determining component 310 can select between the two processing times and/or other processing times (or otherwise determine the processing time) based at least in part on one or more parameters related to UE 302, such as a UE configuration, channel characteristics of an HSPA channel (e.g., a channel index of a high speed shared control channel (HS-SCCH)), etc. For example, such parameters can be used to provide diversity for timing of transmissions from multiple UEs. In another example, control resource determining component 310 can utilize a fixed timing offset between the PCC 330 and SCC 332 corresponding to the timing difference of RAT1 and RAT2 for communicating RAT2 control data over RAT1 PCC 330. In one example, the fixed timing offset can be hardcoded at the UE 302, received in a configuration or broadcast message (e.g., from one or more cells or network components), and/or the like. In a further example, control resource determining component 310 can use the 3 ms timing, used for LTE, for communicating the HSPA control data. In either case, control data communicating component 312 can communicate HSPA retransmission control data for SCC 332 over LTE PCC 330 (e.g., over a physical uplink control channel (PUCCH), physical uplink shared channel (PUSCH) or other LTE channel).

In another example, the RAT2 control data can correspond to channel state information (CSI) for HSPA. CSI can include, for example, channel quality indicator (CQI), precoding matrix indicator (PMI), rank indicator (RI), etc. In this specific example, control resource determining component 310 can determine resources related to one or more LTE containers (e.g., PUCCH, PUSCH, etc.) of the PCC 330 for communicating CSI for HSPA related to RAT2 CC 332. In addition, CSI information can be transmitted with a defined periodicity and/or reporting offset. Thus, control resource determining component 310 can further determine resources similar to the periodicity and/or reporting offset related to RAT1 PCC 330 (e.g., related to LTE) for communicating CSI for RAT2 (e.g., HSPA). As described, the periodicity and/or reporting offset can be similar to that depicted in FIG. 6. For instance, control resource determining component can select a timing of 2.5 slots (1.66 ms) from the end of a HSPA data transmission, which aligns to an LTE subframe, for communicating the control data related to the HSPA data transmission.

Furthermore, in this example, control resource determining component 310 can determine a particular payload size and/or bit-width for the HSPA CSI information to allow reporting in the one or more LTE containers. In addition, control resource determining component 310 can determine resources for transmitting the HSPA CSI information so as not to interfere with LTE CSI or other transmissions related to PCC 330. Moreover, in another example, control data communicating component 312 can refrain from transmitting RAT2 control data. This can include, for example, identifying RAT2, SCC 332, SCell 306, and/or the like in the control data to be transmitted by UE 302, as specified by a higher communication layer, and determining not to process and communicate the control data as it relates to RAT2.

It is to be appreciated that power control for the uplink portion of CC 330 related to RAT1 can be facilitated based at least in part on PCell 304, or a related eNB, determining a power for UE 302 (e.g., based on a received signal strength) and communicating the power control command over CC 330. In addition, power control for the uplink portion of CC 332 related to RAT2 can be controlled at least in part by SCell 306, or related eNB, determining a power and communicating the power control command over CC 332.

Moreover, in the specific example where LTE is RAT1, as described above, handover component 316 can determine to perform one or more handover related functions based on the LTE CC 330. For example, handover component 316 can measure signal quality over the LTE CC 330 for inclusion in a measurement report for handover. In another example, handover component 316 can receive handover related messages over the LTE CC 330, such as a command from PCell 304 to handover communications. In this example, handover component 316 can determine to handover only the PCC 330 to another cell.

Moreover, for example, random access generating component 318 can attempt to access another cell using another LTE CC for obtaining and transmitting message over a RACH. Further, for example, PCell 304 can thus communicate mobility or RACH related packets of the UE 302 over LTE CCs (e.g., the PCC 330, or otherwise) as opposed to an HSPA carrier (e.g., the SCC 332). In addition, for example, PCell 304 can determine that as a primary cell, PCell 304 can communicate mobility and RACH related messages instead of SCell 306. Similarly, SCell 306 can determine not to communicate mobility and RACH related messages based on determining that it is a secondary cell to UE 302. In yet another example, PCell 304 can communicate system information for PCell 304 and/or SCell 306 over the LTE CC 330, and thus, system information receiving component 314 can obtain system information for both RATs over the LTE CC 330.

In any case, in an example, PCell 304 can receive the control data 324 communicated by control data communicating component 312, as described above, and can communicate the control data to SCell 306. Where the PCell 304 and SCell 306 are part of the same eNB, for example, the communication is handled within the eNB. Where the cells are of separate eNBs, the eNBs can communicate the control data over wired or wireless a backhaul link, for example. In another example, SCell 306 can also receive the control data 326 transmitted by control data communicating component 312 over uplink portion of the CC 330.

Figure 4:
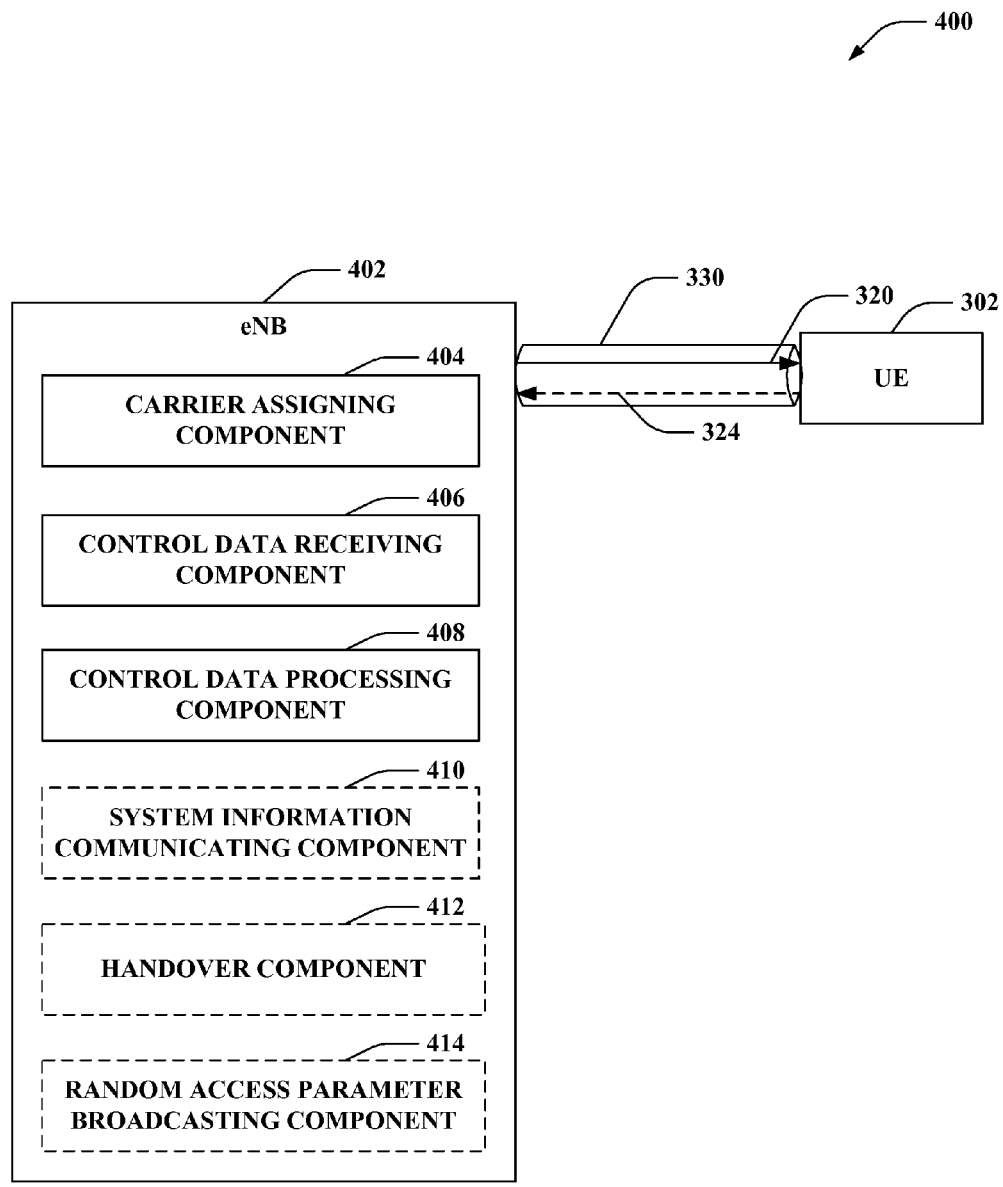
FIG. 4 illustrates an example system for receiving control data of one radio access technology (RAT) over a CC of another RAT.

FIG. 4 illustrates an example system 400 for assigning multiple carriers in CA. System 400 includes an eNB 402 that can provide one or more cells with which UE 302 can communicate to receive wireless network access over one or more CCs. For example, as described, eNB 402 can provide a PCell and/or SCell, with which UE 302 can establish one or more CCs. eNB 402 can be a macro node, femto node, pico node, mobile base station, relay node, UE (e.g., communicating in peer-to-peer or ad-hoc mode with UE 302), a portion thereof, and/or the like.

eNB 402 includes a carrier assigning component 404 for assigning one or more CCs in one or more cells to a UE, a control data receiving component 406 for obtaining control data related to the one or more CCs, and a control data processing component 408 for decoding the control data. eNB 402 optionally includes a system information communicating component 410 for transmitting system information over one or more of the CCs, a handover component 412 for causing handover of one or more of the CCs, and/or a random access parameter broadcasting component 414 for advertising a RACH over one of the CCs.

According to an example, carrier assigning component 404 can assign one or more CCs to UE 302. For example, carrier assigning component 404 can assign a PCC 330 to UE 302 in a PCell (e.g., via carrier assignment 320, as described) and/or one or more SCCs in an SCell. In another example, another eNB (not shown) can assign one or more SCCs to UE 302. In any case, control data receiving component 406 can obtain control data 324 for the PCC 330 and one or more SCCs from the UE over PCC 330. Control data processing component 408 can decode the control data 324 based on a RAT (RAT1) related to the PCC 330, though the control data 324 can include control data of the one or more SCCs, which can be of another RAT (RAT2).

As described, UE 302 can communicate control data 324 for the one or more SCCs using containers, transmission timing, periodicity, etc. of RAT1 over PCC 330. Thus, control data processing component 408 can obtain the SCC control data and can process the control data as RAT2 control data (e.g., for modifying communication properties of an SCell providing the SCCs). In another example, control data processing component 408 can provide the control data to another eNB providing the SCell. In either example, the RAT2 control data is communicated over RAT1 control resources, as described.

Moreover, in an example, system information communicating component 410 can communicate system information for RAT1 (e.g., SIB in LTE) and/or for RAT2 (e.g., HSPA system information) over the PCC 330. This can be based on determining that eNB 402 provides the PCell for UE 302. Similarly, system information communicating component 410 can refrain from communicating system information over an SCell CC, where it is determined the eNB 402 provides only SCells to UE 302. In another example, handover component 412 can perform handover of PCC 330 to another eNB (not shown) while not handing over SCCs. Similarly, this can be based on determining whether or not eNB 402 provides a PCell or SCell. In yet another example, random access parameter broadcasting component 414 can advertise a RACH over the PCC 330 (e.g., and not SCCs), provided that eNB 402 operates the PCell for UE 302.

FIG. 5 illustrates example communication timings 500 for HSPA and LTE systems. A timing for a primary control common physical channel (P-CCPCH) 502 is shown having two consecutive radio frames, which can each span 10 ms. An HS-SCCH timing 504 in HSPA is also shown, which is divided into 5 subframes of a radio frame, each spanning three 0.66 ms HSPA slots (2 ms). A downlink channel assignment can be received by a UE in subframe 0 of the HS-SCCH. The high speed (HS) physical downlink shared channel (HS-PDSCH) timing 506 can be offset from the HS-SCCH timing 504 by 2 slots (1.33 ms), and the subframe occurring during the downlink channel assignment subframe can be used for communication by the eNB to a UE. Furthermore, as shown, a corresponding ACK for communicating over an uplink channel can occur 7.5 slots (5 ms) from the end of the related uplink transmission, as shown by the HS dedicated physical control channel (HS-DPCCH) timing 508.

In addition, physical downlink control channel (PDCCH)/ physical downlink shared channel (PDSCH) timing 510 is shown where ten 1 ms subframes are logically defined in the 10 ms radio frame. Thus, for a transmission at subframe 0 in LTE, uplink ACK occurs at subframe 4 (a 3 ms delay) at PDCCH/PDSCH timing 510. In any case, LTE timing and/or containers (e.g., channels) can be used for communicating uplink ACK for HSPA, as described. In this example, physical uplink control channel (PUCCH)/physical uplink shared channel (PUSCH) timing 512 is shown with one possible alternative for communicating the HSPA control data. In this example, uplink ACK for a HS-PDSCH transmission at subframe 0 in timing 506, can be transmitted at subframe 9 in LTE PUCCH/PUSCH timing 512, which is 8.5 slots (5.66 ms) after the HS-PDSCH transmission. Thus, the uplink ACK transmission for the HS-PDSCH transmission over PUCCH/PUSCH containers and timing occurs 1 slot (0.66 ms) later than if transmitted over HS-DPCCH timing 506, but still during the timing of what would be the HS-DPCCH subframe. Such timings allow an HSPA cell to receive the control data according to similar timings, though the respective UE may use LTE resources for communicating the control data to conserve uplink resources.

In another example, PUCCH/PUSCH timing 514 is shown with another possible alternative for communicating the HSPA control data. In this example, uplink ACK for a HS-PDSCH transmission at subframe 0 in timing 506, can be transmitted at subframe 8 in LTE PUCCH/PUSCH timing 514, which is 7 slots (4.66 ms) after the HS-PDSCH transmission. Thus, the uplink ACK transmission for the HS-PDSCH transmission over PUCCH/PUSCH containers and timing occurs 0.5 slot (0.33 ms) earlier than if transmitted over HS-DPCCH timing 506, but still during the timing of what would be the HS-DPCCH subframe. In the given examples, the uplink ACKs for HSPA can be in odd numbered subframes using PUCCH/PUSCH timing 512, or even numbered subframes for PUCCH/PUSCH timing 514. Thus, in one example as described, UEs can be assigned either of the configurations to allow for diversity in assignment (e.g., based on characteristics or other parameters of the UEs, based on HS-SCCH characteristics, and/or the like).

Figure 6:
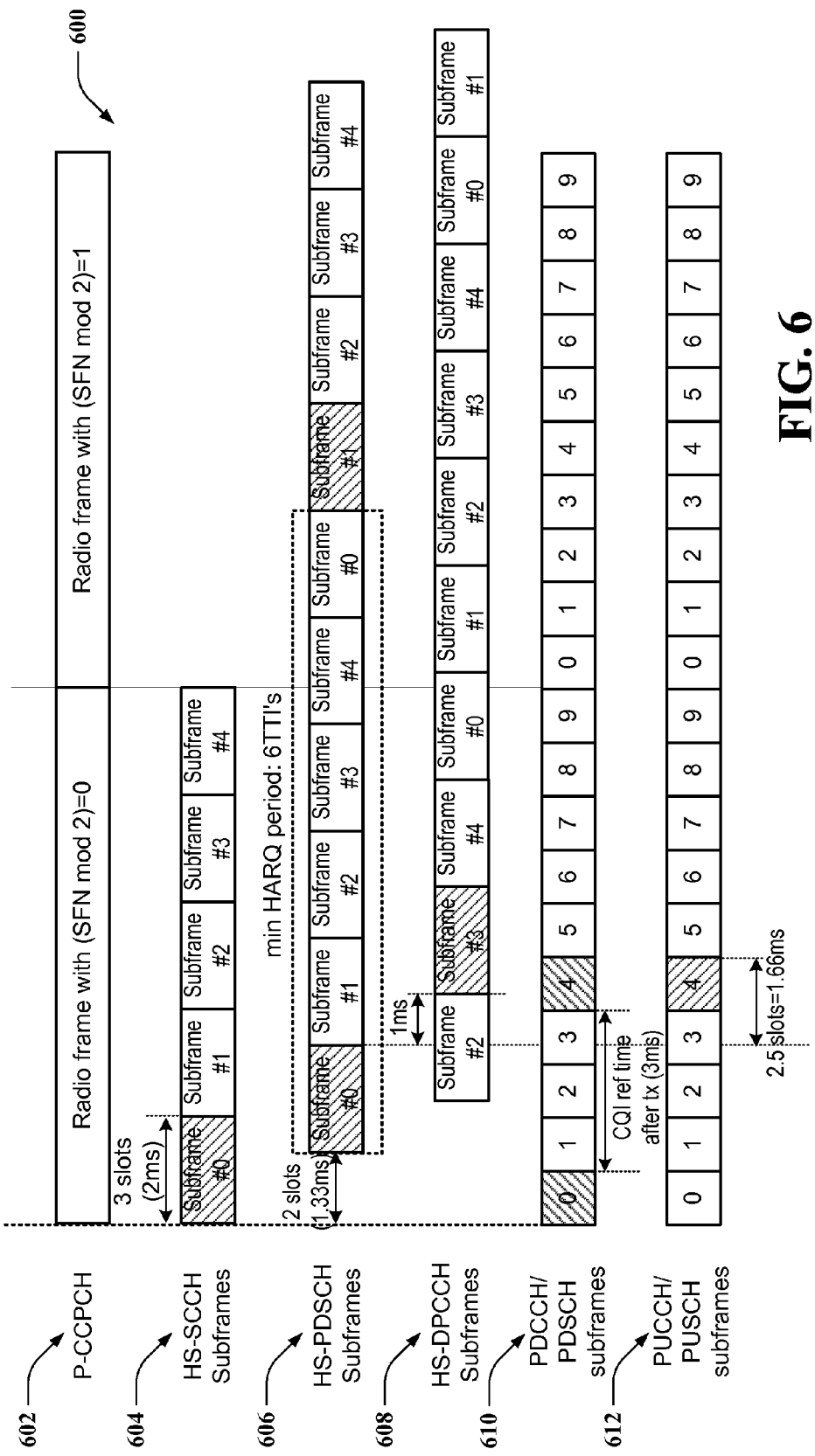

FIG. 6 illustrates example communication timings 600 for HSPA and LTE systems. A timing for a P-CCPCH 602 is shown having two consecutive radio frames, which can each span 10 ms. An HS-SCCH timing 604 in HSPA is also shown, which is divided into 5 subframes of a radio frame, each spanning three 0.66 ms HSPA slots (2 ms). A downlink channel assignment can be received by a UE in subframe 0 of the HS-SCCH. The HS-PDSCH timing 606 can be offset from the HS-SCCH timing 604 by 2 slots (1.33 ms), and the subframe occurring during the downlink channel assignment subframe can be used for communication by the eNB to a UE. Furthermore, as shown, corresponding CSI for transmitting over an uplink channel can occur 1 ms from the end of the related uplink transmission, as shown by the HS-DPCCH timing 608.

In addition, PDCCH/PDSCH timing 610 is shown where ten 1 ms subframes are logically defined in the 10 ms radio frame. Thus, for a transmission at subframe 0 in LTE, CSI transmission occurs at subframe 4 (a 3 ms delay) at PDCCH/PDSCH timing 610. In any case, LTE timing and/or containers can be used for communicating CSI for HSPA, as described. In this example, PUCCH/PUSCH timing 612 is shown with one possible alternative for communicating the HSPA control data. In this example, CSI for a HS-PDSCH transmission at subframe 0 in timing 606, can be transmitted at subframe 4 in LTE PUCCH/PUSCH timing 612, which is 2.5 slots (1.66 ms) after the HS-PDSCH transmission. Thus, the CSI transmission for the HS-PDSCH transmission over PUCCH/PUSCH containers and timing occurs during the timing of what would be the HS-DPCCH subframe. Such timings allow an HSPA cell to receive the control data according to similar timings, though the respective UE may use LTE resources for communicating the control data to conserve uplink resources.

Figure 7:
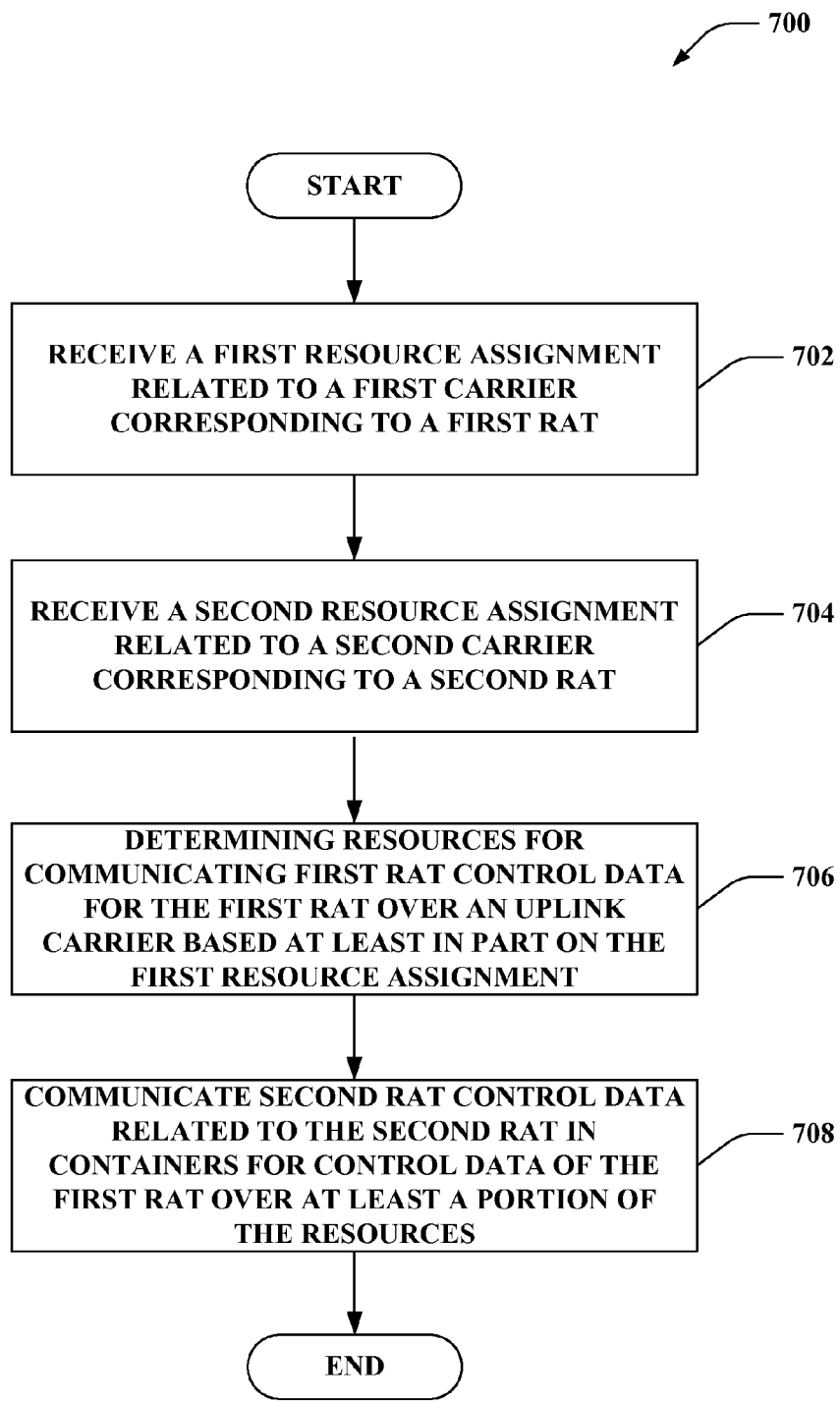
FIG. 7 illustrates an example methodology for communicating control data of one RAT over resources of another RAT.
Figure 8:
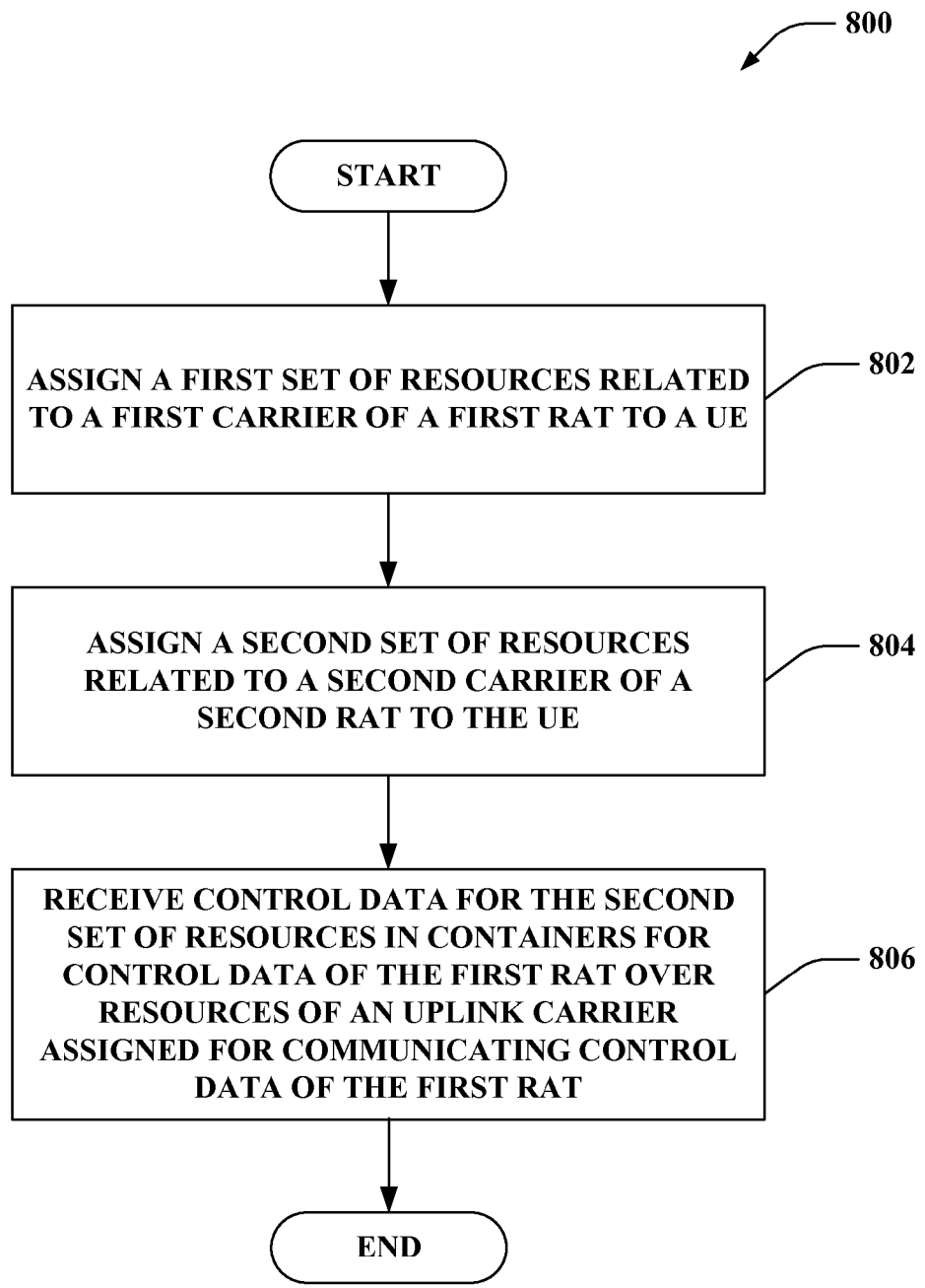
FIG. 8 illustrates an example methodology for receiving control data of one RAT over resources of another RAT.

FIGS. 7-8 illustrate example methodologies for communicating control data in CA with CCs of different RATs. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

FIG. 7 illustrates an example methodology 700 for communicating control data of one RAT using resources of another RAT.

At 702, a first resource assignment related to a first carrier corresponding to a first RAT can be received. The resource assignment can correspond to an uplink or downlink portion of a related CC, and can be determined as a PCC for purposes of transmitting control data. For example, the PCC can be determined based on the order of receiving carriers, a RAT of received carriers, a specification from the cells or related eNBs as to which is the PCC, and/or the like.

At 704, a second resource assignment related to a second carrier corresponding to a second RAT is received. For example, the second resource assignment can similarly correspond to an uplink or downlink portion of a related CC, and can be determined as an SCC. The first and second carriers, as described, can be simultaneously utilized to provide CA. Moreover, the first and second RATs can be different RATs (e.g., LTE and HSPA).

At 706, resources for communicating first RAT control data for the first RAT over an uplink carrier can be determined based in part on the first resource assignment. In one example, the resource assignment can explicitly indicate resources for the uplink carrier. In another example, the uplink carrier resources are determined at an offset from a corresponding downlink carrier of the resource assignment, etc. In any case, the uplink carrier can typically be used to communicate control data or other uplink data in the first RAT, where the control data corresponds to a downlink portion of the first carrier.

At 708, second RAT control data related to the second RAT can also be communicated in containers for control data of the first RAT over at least a portion of the resources. As described, this can include utilizing the channels of the first RAT (e.g., PUCCH in LTE) to communicate the control data of the second RAT. In another example, this can include utilizing a timing specific to the first RAT for communicating the second RAT control data, where the timing can be selected to be similar or near that of the second RAT. The control data can be received over the uplink carrier related to the first RAT, and processed or otherwise provided to a cell related to the second RAT. The control data can include ACK, CSI, etc.

Moreover, in some examples, system information can be communicated over the first carrier, handover can occur for the first carrier and not the second carrier, RACH can be advertised over the first carrier, etc. to minimize complexity of the multiple RAT CA.

FIG. 8 depicts an example methodology 800 for obtaining control data for one RAT over resources related to another RAT.

At 802, a first set of resources related to a first carrier of a first RAT can be assigned to a UE. As described, this can include assigning a downlink portion of the first carrier, and/or an uplink portion (e.g., by explicit resource assignment, a known association to the downlink portion, etc.).

At 804, a second set of resources related to a second carrier of a second RAT can be assigned to the UE. The first and second carriers can operate using CA over the different RATs to simultaneously provide improved service.

At 806, control data for the second set of resources can be received in containers for control data of the first RAT over resources of an uplink carrier assigned for communicating control data of the first RAT. As described, this can include receiving the control data for the second RAT over control channels of the first RAT, based on timing used by the first RAT, and/or the like. The control data can include ACK, CSI, and/or the like.

Figure 9:
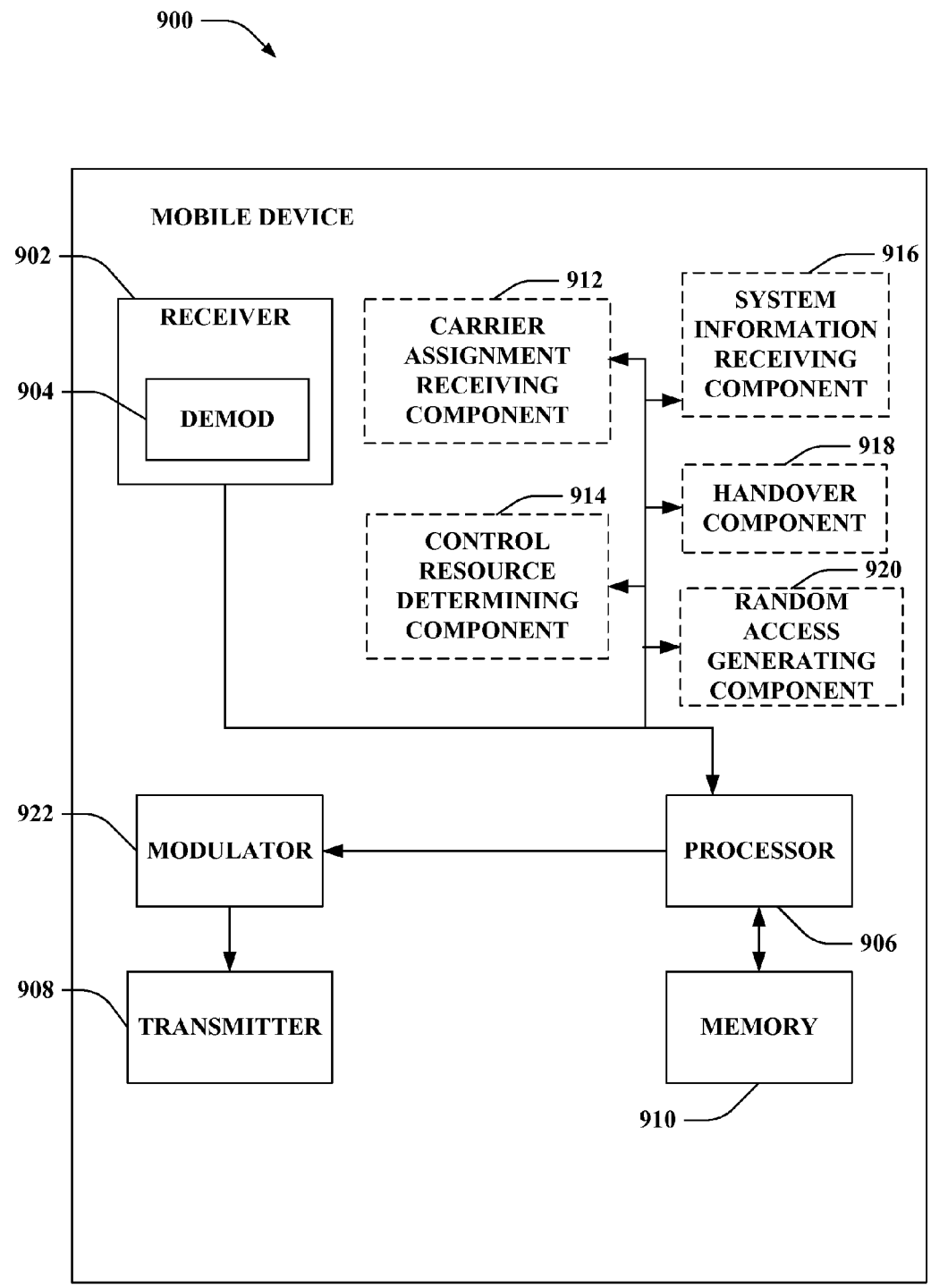
FIG. 9 illustrates an example mobile device in accordance with aspects described herein.

FIG. 9 is an illustration of a mobile device 900 that facilitates communicating control data in CA. Mobile device 900 may include a receiver 902 that receives a signal from, for instance, a receive antenna (not shown), performs typical actions on (e.g., filters, amplifies, downconverts, etc.) the received signal, and digitizes the conditioned signal to obtain samples. Receiver 902 can include a demodulator 904 that can demodulate received symbols and provide them to a processor 906 for channel estimation. Processor 906 can be a processor dedicated to analyzing information received by receiver 902 and/or generating information for transmission by a transmitter 908, a processor that controls one or more components of mobile device 900, and/or a processor that both analyzes information received by receiver 902, generates information for transmission by transmitter 908, and controls one or more components of mobile device 900.

Mobile device 900 can additionally include memory 910 that is operatively coupled to processor 906 and that can store data to be transmitted, received data, information related to available channels, data associated with analyzed signal and/or interference strength, information related to an assigned channel, power, rate, or the like, and any other suitable information for estimating a channel and communicating via the channel. Memory 910 can additionally store protocols and/or algorithms associated with estimating and/or utilizing a channel (e.g., performance based, capacity based, etc.).

It will be appreciated that the data store (e.g., memory 910) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 910 of the subject systems and methods is intended to include, without being limited to, these and any other suitable types of memory.

Processor 906 can further be optionally operatively coupled to a carrier assignment receiving component 912, which can be similar to carrier assignment receiving component 308, a control resource determining component 914, which can be similar to control resource determining component 310, a system information receiving component 916, which can be similar to system information receiving component 314, a handover component 918, which can be similar to handover component 316, and/or a random access generating component 920, which can be similar to random access generating component 318. Mobile device 900 still further includes a modulator 922 that modulates signals for transmission by transmitter 908 to, for instance, a base station, another mobile device, etc. For example, transmitter 908 can be similar to, or can comprise, a control data communicating component 312, as described. Moreover, for example, mobile device 900 can include multiple transmitters 908 for multiple network interfaces, as described.

Although depicted as being separate from the processor 906, it is to be appreciated that the carrier assignment receiving component 912, control resource determining component 914, system information receiving component 916, handover component 918, random access generating component 920, demodulator 904, and/or modulator 922 can be part of the processor 906 or multiple processors (not shown)), and/or stored as instructions in memory 910 for execution by processor 906.

Figure 10:
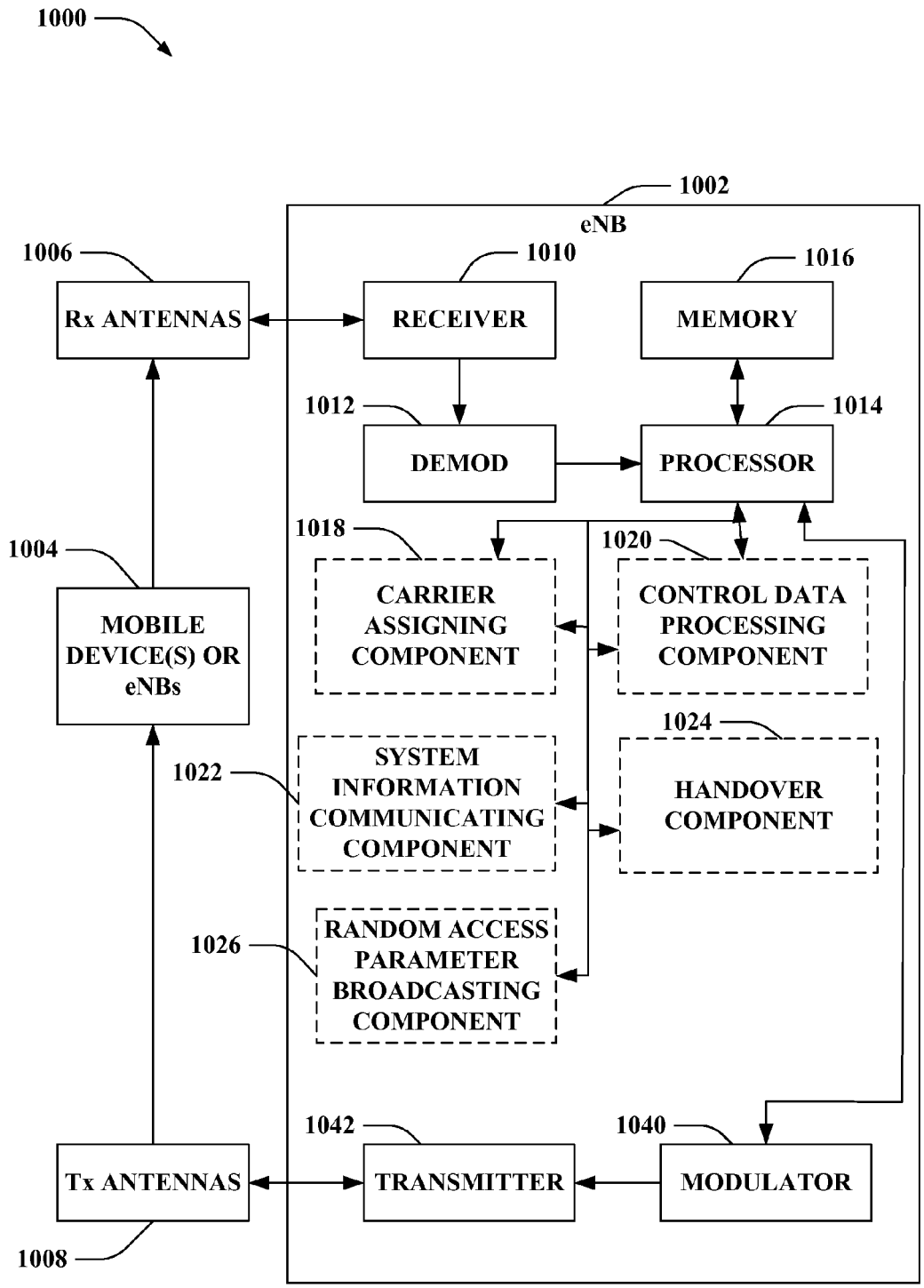
FIG. 10 illustrates an example system in accordance with aspects described herein.

FIG. 10 is an illustration of a system 1000 that facilitates receiving control data for multiple RATs over a single CC. System 1000 includes a eNB 1002 having a receiver 1010 that receives signal(s) from one or more mobile devices or eNBs 1004 through a plurality of receive antennas 1006 (e.g., which can be of multiple network technologies), and a transmitter 1042 that transmits to the one or more mobile devices or eNBs 1004 through a plurality of transmit antennas 1008 (e.g., which can be of multiple network technologies). For example, eNB 1002 can transmit signals received from eNBs 1004 to other eNBs 1004, and/or vice versa.

Receiver 1010 can receive information from one or more receive antennas 1006 and is operatively associated with a demodulator 1012 that demodulates received information. In addition, in an example, receiver 1010 can receive from a wired backhaul link. Though depicted as separate antennas, it is to be appreciated that at least one of receive antennas 1006 and a corresponding one of transmit antennas 1008 can be combined as the same antenna. Moreover, receiver 1010 can be, or can otherwise include, a control data receiving component 406, as described above. Demodulated symbols are analyzed by a processor 1014, which is coupled to a memory 1016 that stores information related to performing one or more aspects described herein.

Processor 1014, for example, can be a processor dedicated to analyzing information received by receiver 1010 and/or generating information for transmission by a transmitter 1042, a processor that controls one or more components of eNB 1002, and/or a processor that analyzes information received by receiver 1010, generates information for transmission by transmitter 1042, and controls one or more components of eNB 1002. In addition, processor 1014 can perform one or more functions described herein and/or can communicate with components for such a purpose. Moreover, processor 1014 can be similar to processor 906 in FIG. 9, and memory 1016 can be similar to memory 910 in FIG. 9.

Processor 1014 is further optionally coupled to a carrier assigning component 1018, which can be similar to carrier assigning component 404, a control data processing component 1020, which can be similar to control data processing component 408, a system information communicating component 1022, which can be similar to system information communicating component 410, a handover component 1024, which can be similar to handover component 412, and/or a random access parameter broadcasting component 1026, which can be similar to random access parameter broadcasting component 414. Transmitter 1042 can transmit signals to mobile devices or eNBs 1004 over Tx antennas 1008. Furthermore, although depicted as being separate from the processor 1014, it is to be appreciated that the carrier assigning component 1018, control data processing component 1020, system information communicating component 1022, handover component 1024, random access parameter broadcasting component 1026, demodulator 1012, and/or modulator 1040 can be part of the processor 1014 or multiple processors (not shown), and/or stored as instructions in memory 1016 for execution by processor 1014.

Figure 11:
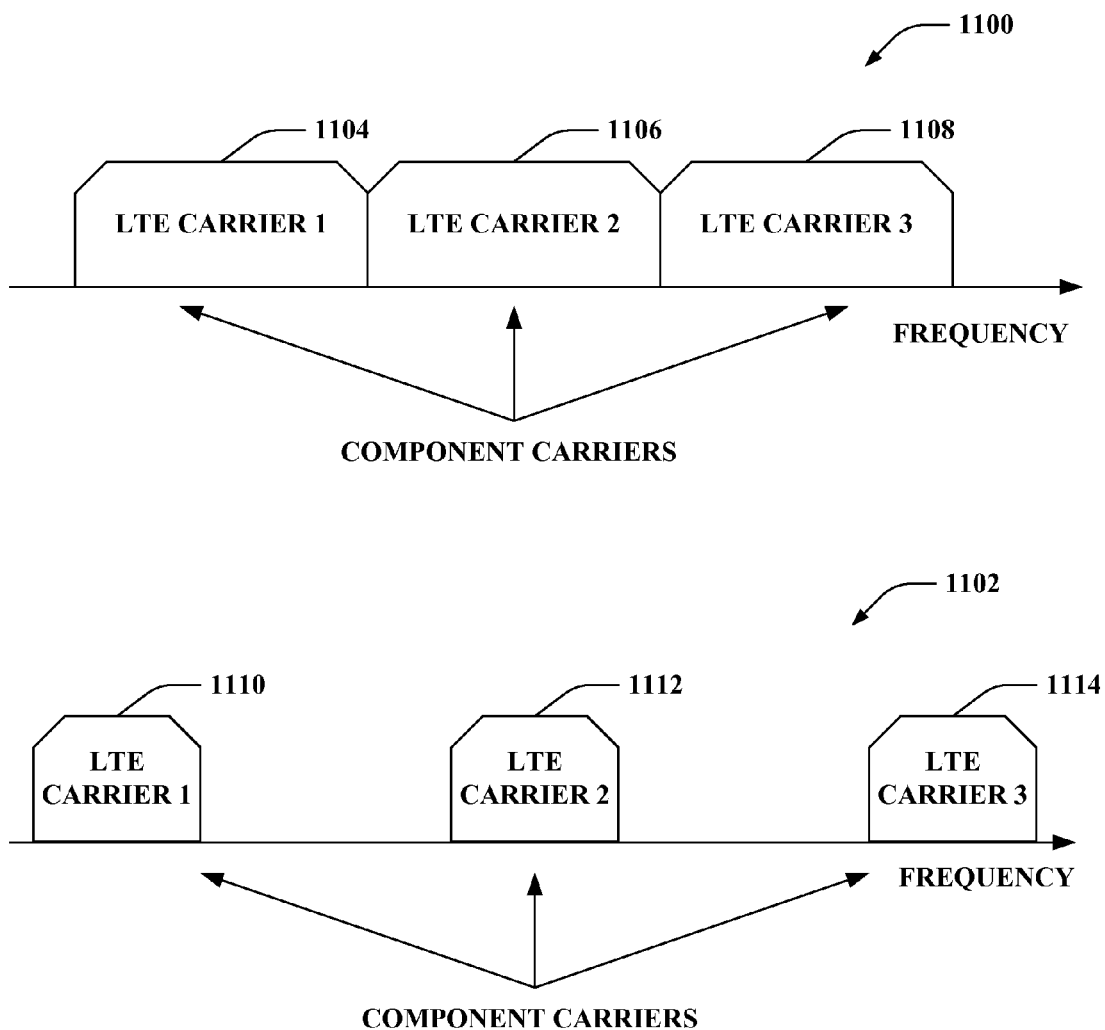
FIG. 11 illustrates example carrier aggregation configurations.

Various aspects herein are described in terms of multicarrier configurations. Some examples of a multicarrier configuration are proposed for the LTE-Advanced mobile systems including continuous CA and non-continuous CA, examples of which are illustrated in FIG. 11. Continuous CA is shown at 1100 and occurs when multiple available component carriers 1104, 1106, and 1108 are assigned as adjacent to each other in frequency. In non-continuous CA, shown at 1102, the component carriers 1110, 1112, and 1114 can be assigned such that they are not adjacent in frequency. Both non-continuous and continuous CA aggregate multiple LTE/component carriers to serve a single LTE-Advanced UE, for example.

An LTE-Advanced UE can employ multiple radio frequency (RF) receiving units and multiple fast Fourier transforms with non-continuous CA since the carriers are separated along the frequency band. Where continuous CA is used, one RF receiving component and FFT may be sufficient to receive over all carriers. Because non-continuous CA supports data transmissions over multiple separated carriers across a large frequency range, propagation path loss, Doppler shift and other radio channel characteristics may vary at different frequency bands.

Thus, to support broadband data transmission under the non-continuous CA approach, methods may be used to adaptively adjust coding, modulation, and transmission power for different component carriers. For example, in an LTE-Advanced system where the eNB has fixed transmitting power on each component carrier, the effective coverage or supportable modulation and coding of each component carrier may be different. In any case, the carriers 1104, 1106, and 1108, or 1110, 1112, and 1114 can be assigned by multiple eNBs or related cells, and the LTE-Advanced UE can report cell identifiers for each to a positioning server, as described.

Figure 12:
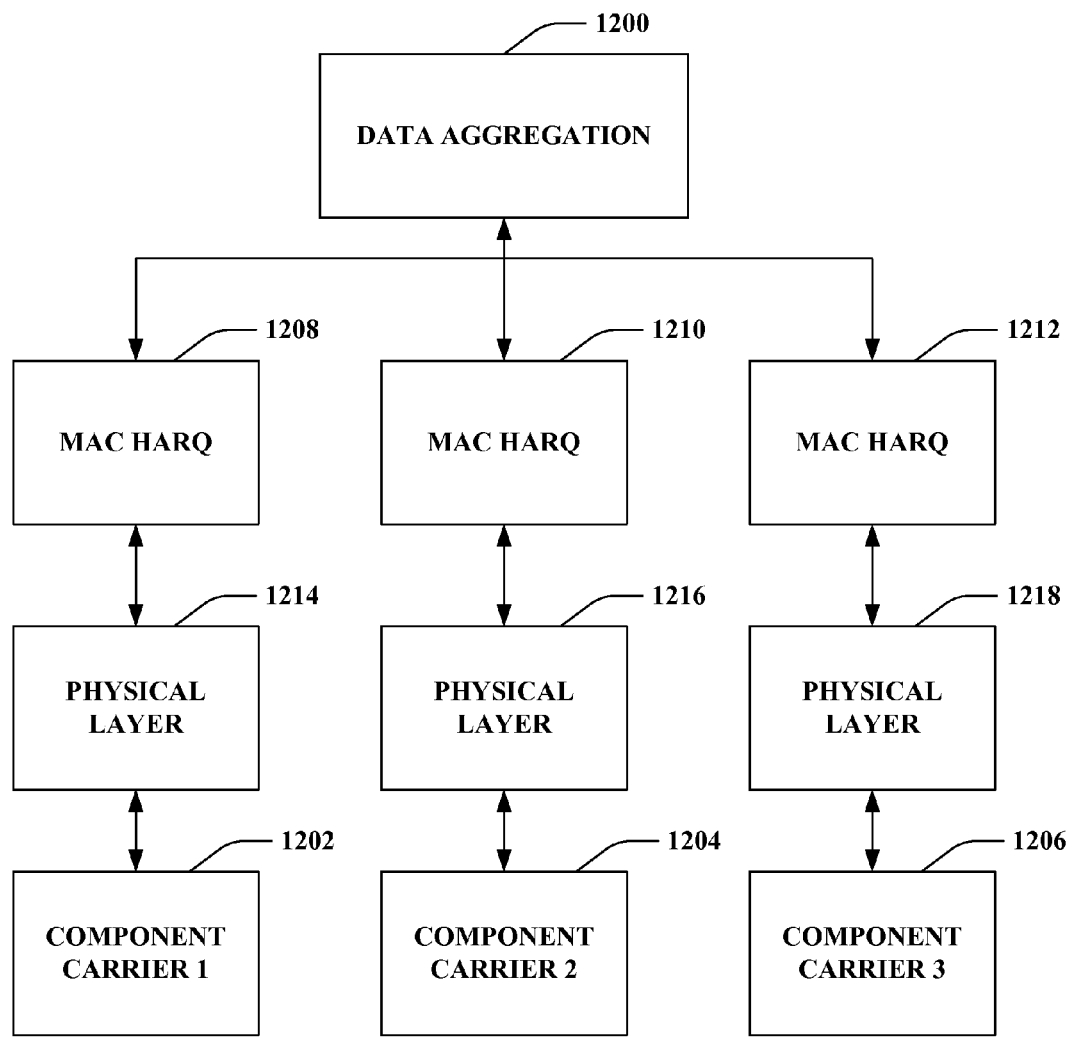
FIG. 12 illustrates example MAC layer carrier aggregation.

FIG. 12 illustrates example data aggregation 1200 to aggregate transmission blocks (TBs) from different component carriers 1202, 1204, and 1206 at the medium access control (MAC) layer for an International Mobile Telecommunications (IMT)-Advanced or similar system. With MAC layer data aggregation, each component carrier 1202, 1204, and 1206, has its own independent hybrid automatic repeat request (HARQ) entity 1208, 1210, and 1212 in the MAC layer and its own transmission configuration parameters (e.g., transmitting power, modulation and coding schemes, and multiple antenna configuration) in the physical layer. Similarly, in the physical layer, one HARQ entity 1214, 1216, and 1218 can be provided for each component carrier.

In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier. The control information for the multiple component carriers can be integrated as the signaling content in this dedicated control channel. As a result, backward compatibility with the control channel structure in LTE systems is maintained, while signaling overhead in the CA is reduced.

Multiple control channels for different component carriers are jointly coded and then transmitted over the entire frequency band formed by a third CA method. This approach offers low signaling overhead and high decoding performance in control channels, at the expense of high power consumption at the UE side. This method, however, may not be compatible with some LTE systems.

Moreover, for example, in CA, control functions from at least two carriers can be aggregated onto one carrier to form a PCC and one or more associated SCCs. Communication links can be established for the PCC and each SCC with one or more cells or related eNBs. Then, communication can be controlled based on the PCC, in one example of a multicarrier configuration.

Figure 13:
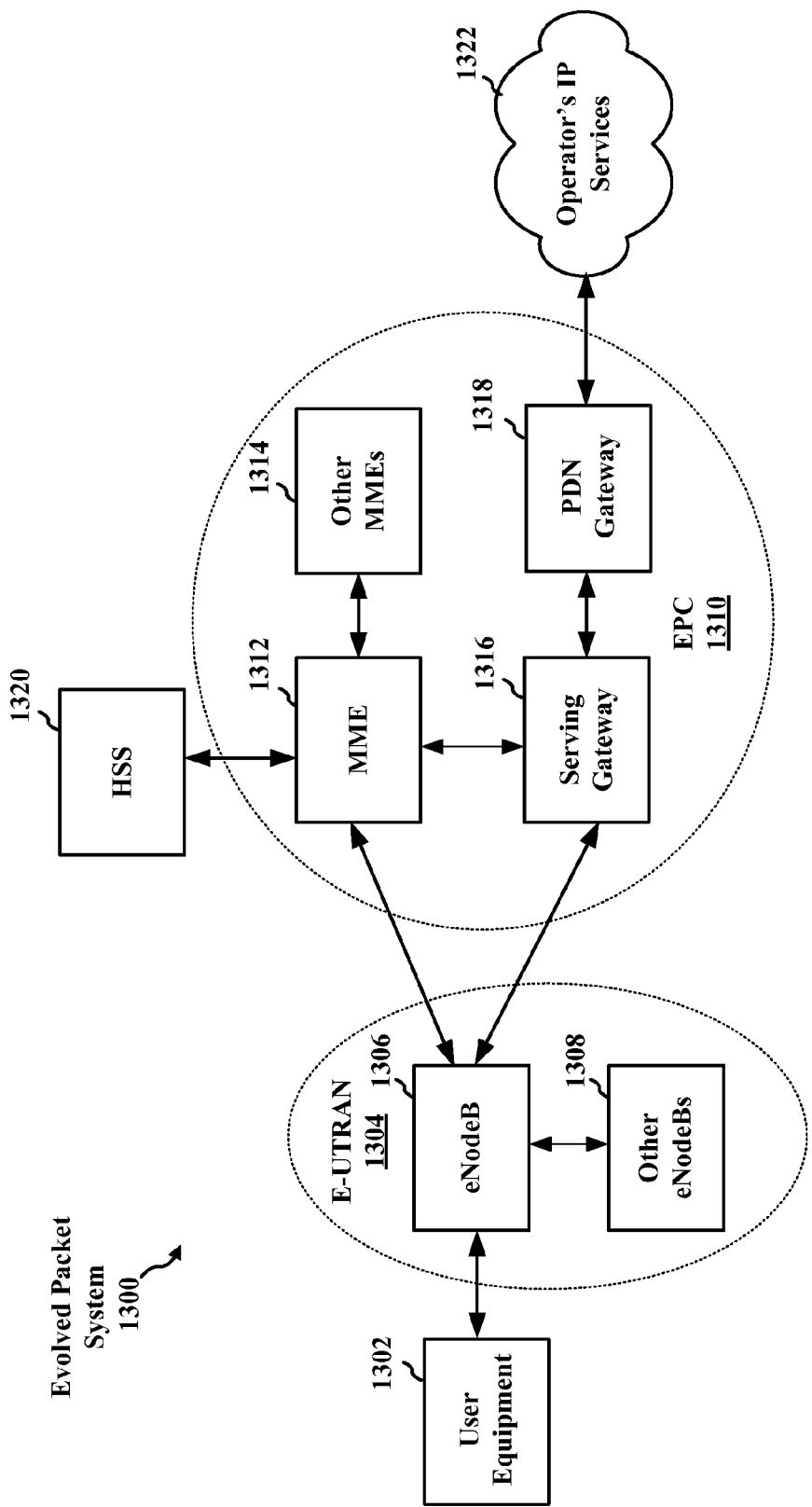
FIG. 13 is a diagram illustrating an example of a network architecture.

FIG. 13 is a diagram illustrating an LTE network architecture 1300. The LTE network architecture 1300 may be referred to as an Evolved Packet System (EPS) 1300. The EPS 1300 may include one or more user equipment (UE) 1302, an Evolved UMTS Terrestrial Radio Access Network (E-UTRAN) 1304, an Evolved Packet Core (EPC) 1310, a Home Subscriber Server (HSS) 1320, and an Operator's IP Services 1322. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 1306 and other eNBs 1308. The eNB 1306 provides user and control planes protocol terminations toward the UE 1302. The eNB 1306 may be connected to the other eNBs 1308 via an X2 interface (e.g., backhaul). The eNB 1306 may also be referred to as a base station, a base transceiver station, a radio base station, a radio transceiver, a transceiver function, a basic service set (BSS), an extended service set (ESS), or some other suitable terminology. The eNB 1306 provides an access point to the EPC 1310 for a UE 1302. Examples of UEs 1302 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 1302 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 1306 is connected by an S1 interface to the EPC 1310. The EPC 1310 includes a Mobility Management Entity (MME) 1312, other MMEs 1314, a Serving Gateway 1316, and a Packet Data Network (PDN) Gateway 1318. The MME 1312 is the control node that processes the signaling between the UE 1302 and the EPC 1310. Generally, the MME 1312 provides bearer and connection management. All user IP packets are transferred through the Serving Gateway 1316, which itself is connected to the PDN Gateway 1318. The PDN Gateway 1318 provides UE IP address allocation as well as other functions. The PDN Gateway 1318 is connected to the Operator's IP Services 1322. The Operator's IP Services 1322 may include the Internet, the Intranet, an IP Multimedia Subsystem (IMS), and a PS Streaming Service (PSS).

Figure 14:
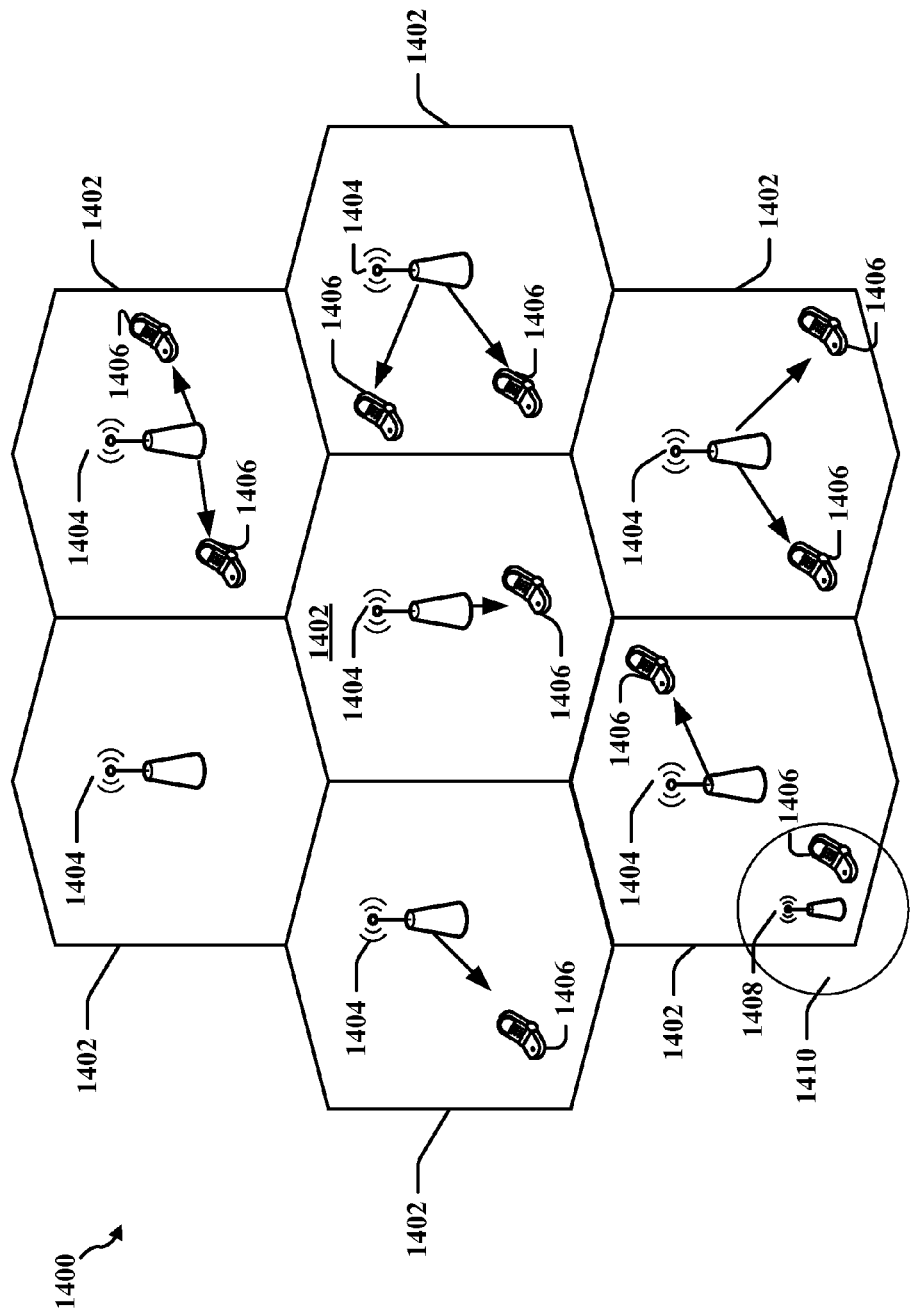
FIG. 14 is a diagram illustrating an example of an access network.

FIG. 14 is a diagram illustrating an example of an access network 1400 in an LTE network architecture. In this example, the access network 1400 is divided into a number of cellular regions (cells) 1402. One or more lower power class eNBs 1408 may have cellular regions 1410 that overlap with one or more of the cells 1402. A lower power class eNB 1408 may be referred to as a remote radio head (RRH). The lower power class eNB 1408 may be a femto cell (e.g., home eNB (HeNB)), pico cell, or micro cell). The macro eNBs 1404 are each assigned to a respective cell 1402 and are configured to provide an access point to the EPC 1310 for all the UEs 1406 in the cells 1402. There is no centralized controller in this example of an access network 1400, but a centralized controller may be used in alternative configurations. The eNBs 1404 are responsible for all radio related functions including radio bearer control, admission control, mobility control, scheduling, security, and connectivity to the serving gateway 1316.

The modulation and multiple access scheme employed by the access network 1400 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 1404 may have multiple antennas supporting MIMO technology. The use of MIMO technology enables the eNBs 1404 to exploit the spatial domain to support spatial multiplexing, beamforming, and transmit diversity. Spatial multiplexing may be used to transmit different streams of data simultaneously on the same frequency. The data steams may be transmitted to a single UE 1406 to increase the data rate or to multiple UEs 1406 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 1406 with different spatial signatures, which enables each of the UE(s) 1406 to recover the one or more data streams destined for that UE 1406. On the UL, each UE 1406 transmits a spatially precoded data stream, which enables the eNB 1404 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 15:
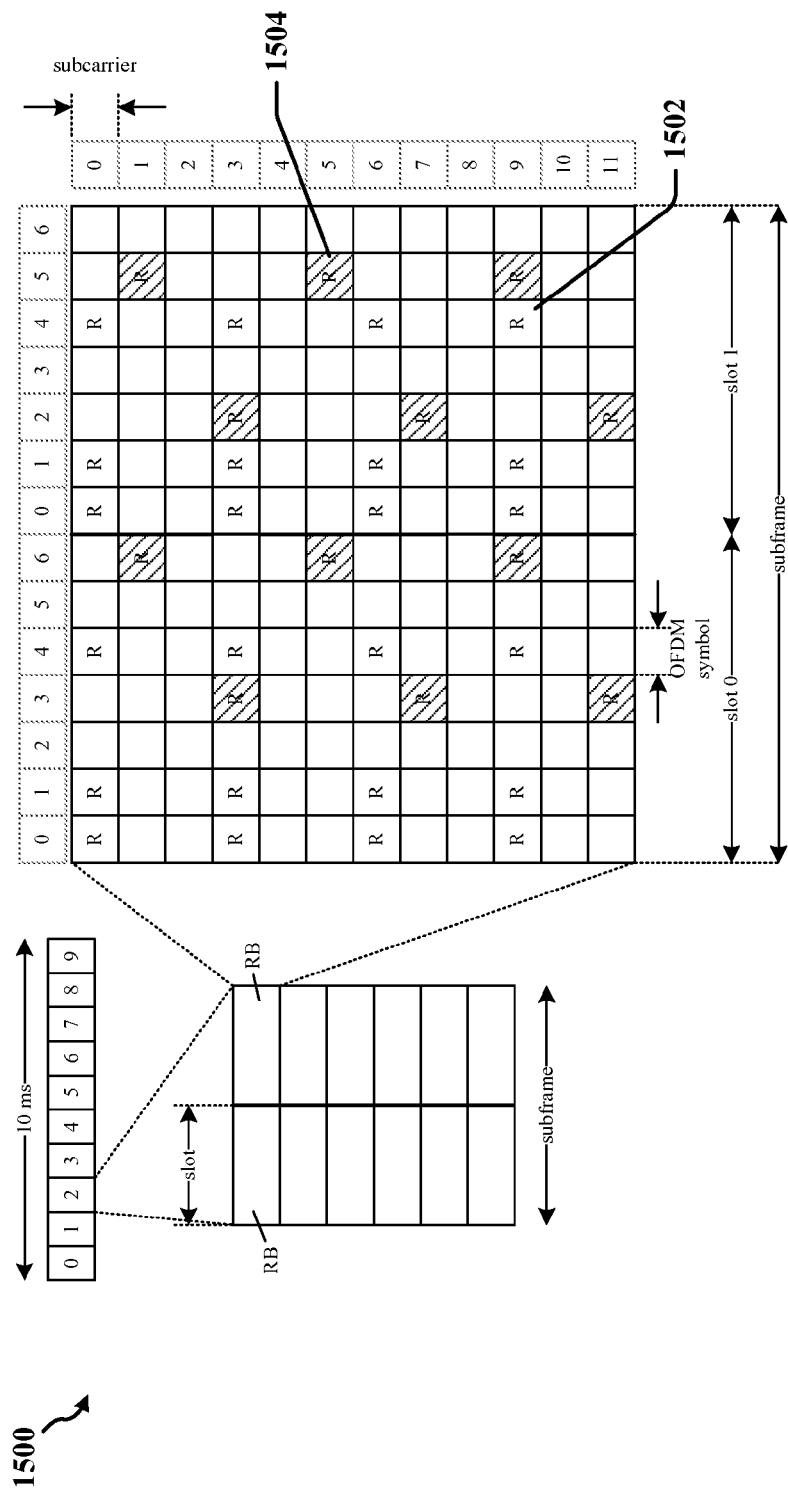
FIG. 15 is a diagram illustrating an example of a downlink (DL) frame structure in LTE.

FIG. 15 is a diagram 1500 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 1502, 1504, include DL reference signals (DL-RS). The DL-RS include Cell-specific RS (CRS) (also sometimes called common RS) 1502 and UE-specific RS (UE-RS) (also known as demodulation reference signals (DM-RS)) 1504. UE-RS 1504 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 16:
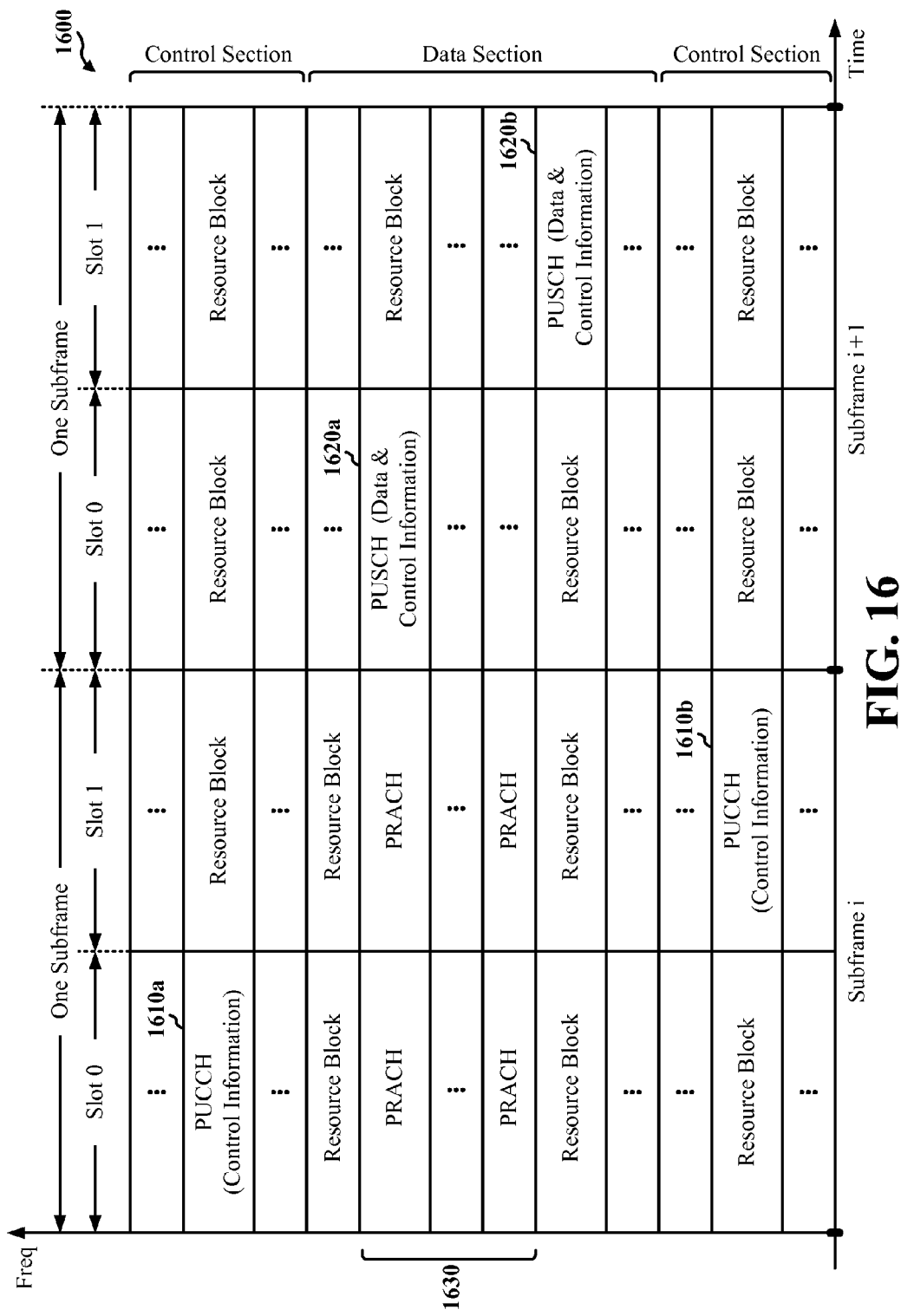
FIG. 16 is a diagram illustrating an example of an uplink (UL) frame structure in LTE.

FIG. 16 is a diagram 1600 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 1610*a*, 1610*b* in the control section to transmit control information to an eNB. The UE may also be assigned resource blocks 1620*a*, 1620*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a sub-frame and may hop across frequency.

A set of resource blocks may be used to perform initial system access and achieve UL synchronization in a physical random access channel (PRACH) 1630. The PRACH 1630 carries a random sequence and cannot carry any UL data/ signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 17:
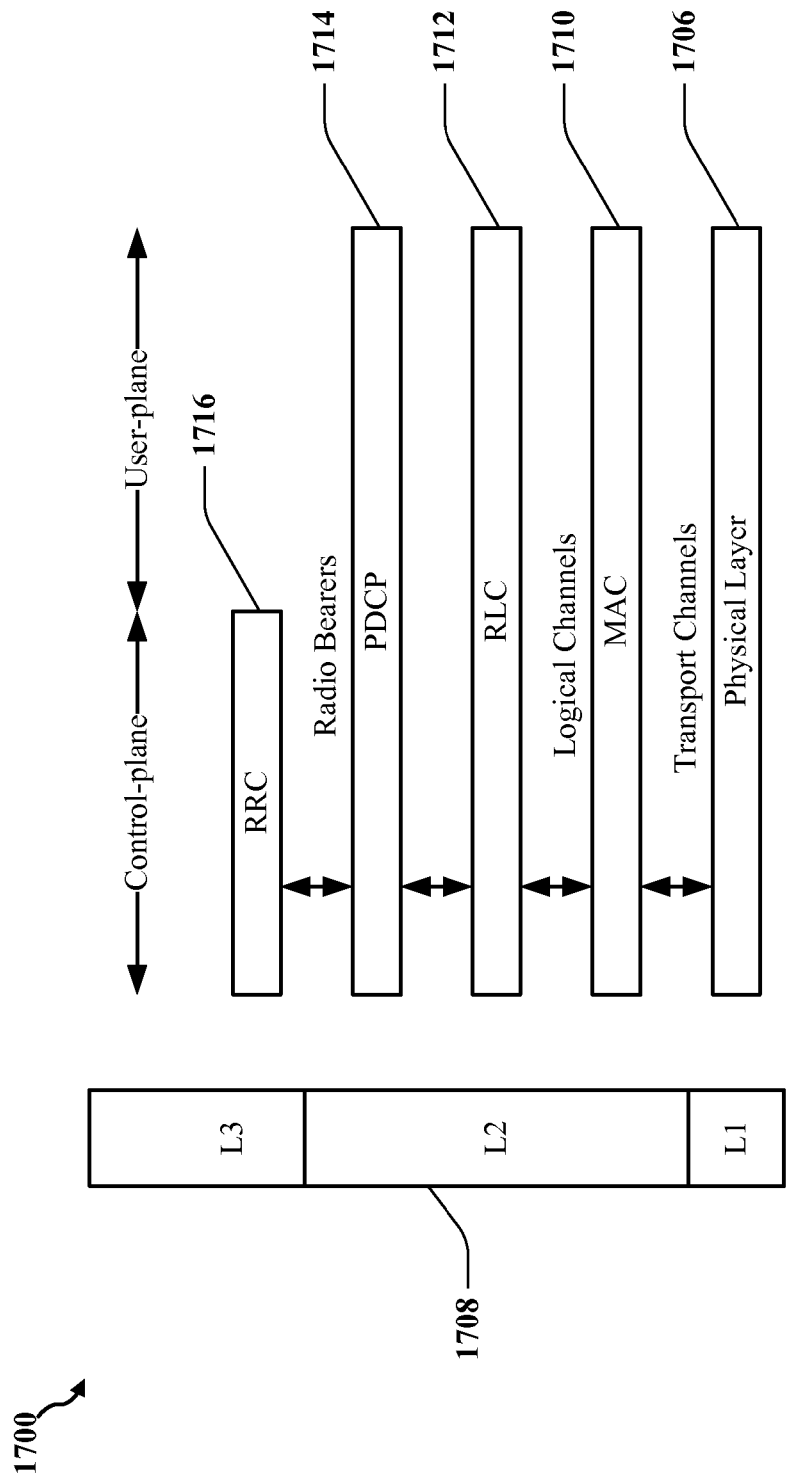
FIG. 17 is a diagram illustrating an example of a radio protocol architecture for the user and control planes.

FIG. 17 is a diagram 1700 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 1706. Layer 2 (L2 layer) 1708 is above the physical layer 1706 and is responsible for the link between the UE and eNB over the physical layer 1706.

In the user plane, the L2 layer 1708 includes a media access control (MAC) sublayer 1710, a radio link control (RLC) sublayer 1712, and a packet data convergence protocol (PDCP) 1714 sublayer, which are terminated at the eNB on the network side. Although not shown, the UE may have several upper layers above the L2 layer 1708 including a network layer (e.g., IP layer) that is terminated at the PDN gateway 1318 on the network side, and an application layer that is terminated at the other end of the connection (e.g., far end UE, server, etc.).

The PDCP sublayer 1714 provides multiplexing between different radio bearers and logical channels. The PDCP sublayer 1714 also provides header compression for upper layer data packets to reduce radio transmission overhead, security by ciphering the data packets, and handover support for UEs between eNBs. The RLC sublayer 1712 provides segmentation and reassembly of upper layer data packets, retransmission of lost data packets, and reordering of data packets to compensate for out-of-order reception due to hybrid automatic repeat request (HARQ). The MAC sublayer 1710 provides multiplexing between logical and transport channels. The MAC sublayer 1710 is also responsible for allocating the various radio resources (e.g., resource blocks) in one cell among the UEs. The MAC sublayer 1710 is also responsible for HARQ operations.

In the control plane, the radio protocol architecture for the UE and eNB is substantially the same for the physical layer 1706 and the L2 layer 1708 with the exception that there is no header compression function for the control plane. The control plane also includes a radio resource control (RRC) sublayer 1716 in Layer 3 (L3 layer). The RRC sublayer 1716 is responsible for obtaining radio resources (e.g., radio bearers) and for configuring the lower layers using RRC signaling between the eNB and the UE.

Figure 18:
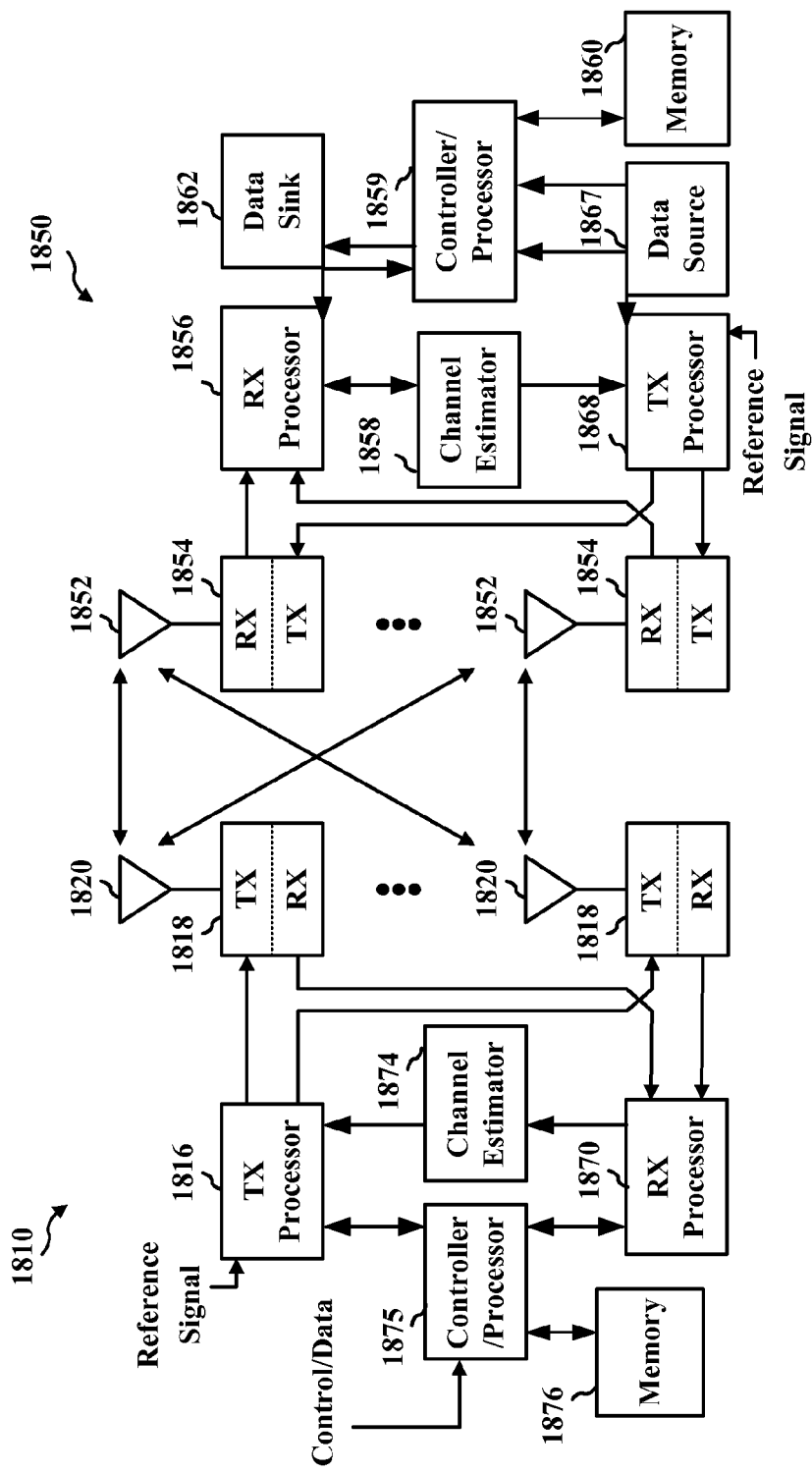
FIG. 18 is a diagram illustrating an example of an evolved Node B and user equipment in an access network.

FIG. 18 is a block diagram of an eNB 1810 in communication with a UE 1850 in an access network. In the DL, upper layer packets from the core network are provided to a controller/processor 1875. The controller/processor 1875 implements the functionality of the L2 layer. In the DL, the controller/processor 1875 provides header compression, ciphering, packet segmentation and reordering, multiplexing between logical and transport channels, and radio resource allocations to the UE 1850 based on various priority metrics. The controller/processor 1875 is also responsible for HARQ operations, retransmission of lost packets, and signaling to the UE 1850.

The transmit (TX) processor 1816 implements various signal processing functions for the L1 layer (e.g., physical layer). The signal processing functions includes coding and interleaving to facilitate forward error correction (FEC) at the UE 1850 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 1874 may be used to determine the coding and modulation scheme, as well as for spatial processing. The channel estimate may be derived from a reference signal and/or channel condition feedback transmitted by the UE 1850. Each spatial stream is then provided to a different antenna 1820 via a separate transmitter 1818TX. Each transmitter 1818TX modulates an RF carrier with a respective spatial stream for transmission.

At the UE 1850, each receiver 1854RX receives a signal through its respective antenna 1852. Each receiver 1854RX recovers information modulated onto an RF carrier and provides the information to the receive (RX) processor 1856. The RX processor 1856 implements various signal processing functions of the L1 layer. The RX processor 1856 performs spatial processing on the information to recover any spatial streams destined for the UE 1850. If multiple spatial streams are destined for the UE 1850, they may be combined by the RX processor 1856 into a single OFDM symbol stream. The RX processor 1856 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 1810. These soft decisions may be based on channel estimates computed by the channel estimator 1858. The soft decisions are then decoded and deinterleaved to recover the data and control signals that were originally transmitted by the eNB 1810 on the physical channel. The data and control signals are then provided to the controller/processor 1859.

The controller/processor 1859 implements the L2 layer. The controller/processor can be associated with a memory 1860 that stores program codes and data. The memory 1860 may be referred to as a computer-readable medium. In the UL, the control/processor 1859 provides demultiplexing between transport and logical channels, packet reassembly, deciphering, header decompression, control signal processing to recover upper layer packets from the core network. The upper layer packets are then provided to a data sink 1862, which represents all the protocol layers above the L2 layer. Various control signals may also be provided to the data sink 1862 for L3 processing. The controller/processor 1859 is also responsible for error detection using an acknowledgement (ACK) and/or negative acknowledgement (NACK) protocol to support HARQ operations.

In the UL, a data source 1867 is used to provide upper layer packets to the controller/processor 1859. The data source 1867 represents all protocol layers above the L2 layer. Similar to the functionality described in connection with the DL transmission by the eNB 1810, the controller/processor 1859 implements the L2 layer for the user plane and the control plane by providing header compression, ciphering, packet segmentation and reordering, and multiplexing between logical and transport channels based on radio resource allocations by the eNB 1810. The controller/processor 1859 is also responsible for HARQ operations, retransmission of lost packets, and signaling to the eNB 1810.

Channel estimates derived by a channel estimator 1858 from a reference signal or feedback transmitted by the eNB 1810 may be used by the TX processor 1868 to select the appropriate coding and modulation schemes, and to facilitate spatial processing. The spatial streams generated by the TX processor 1868 are provided to different antenna 1852 via separate transmitters 1854TX. Each transmitter 1854TX modulates an RF carrier with a respective spatial stream for transmission.

The UL transmission is processed at the eNB 1810 in a manner similar to that described in connection with the receiver function at the UE 1850. Each receiver 1818RX receives a signal through its respective antenna 1820. Each receiver 1818RX recovers information modulated onto an RF carrier and provides the information to a RX processor 1870. The RX processor 1870 may implement the L1 layer.

The controller/processor 1875 implements the L2 layer. The controller/processor 1875 can be associated with a memory 1876 that stores program codes and data. The memory 1876 may be referred to as a computer-readable medium. In the UL, the controller/processor 1875 provides demultiplexing between transport and logical channels, packet reassembly, deciphering, header decompression, control signal processing to recover upper layer packets from the UE 1850. Upper layer packets from the controller/processor 1875 may be provided to the core network. The controller/processor 1875 is also responsible for error detection using an ACK and/or NACK protocol to support HARQ operations.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for communicating control information in a carrier aggregation configuration, comprising:
   receiving, at a user equipment (UE) from a first cell, a first resource assignment for a first downlink carrier of a first radio access technology (RAT);
   receiving, at the UE from a second cell different than the first cell, a second resource assignment for a second downlink carrier of a second RAT, wherein the first downlink carrier and the second downlink carrier are aggregated for communicating data in a wireless network;
   determining, by the UE, resources for communicating first RAT control data for the first RAT over an uplink carrier corresponding to the first downlink carrier based at least in part on the first resource assignment;
   determining, by the UE, a first processing time corresponding to the first RAT, that is different from a second processing time defined by the second RAT, by selecting the first processing time from a plurality of processing times based at least in part on channel characteristics related to a channel of the second RAT, wherein the first processing time is for communicating the second RAT control data over a portion of the resources for communicating the first RAT control data, and wherein the first processing time is configured to minimize a time difference to the second processing time defined by the second RAT; and communicating, by the UE, second RAT control data using a control channel of the uplink carrier of the first RAT over at least the portion of the resources for communicating the first RAT control data based only on the first processing time, wherein communicating includes adapting the second RAT control data for transmitting on the control channel of the first RAT.

2. The method of claim 1, wherein the first RAT comprises long term evolution, the second RAT comprises high speed packet access, and the first processing time is selected to be either 7 slots or 8.5 slots of the first RAT.

3. The method of claim 1, further comprising determining the first processing time as a fixed time offset between a first RAT processing time of the first RAT and the second processing time of the second RAT.

4. The method of claim 1, wherein the first RAT comprises long term evolution, the second RAT comprises high speed packet access, and the first processing time is 3 milliseconds.

5. The method of claim 1, wherein the communicating the second RAT control data further comprises communicating over the resources using a transmission periodicity and a reporting offset related to the first RAT.

6. The method of claim 1, wherein the first RAT comprises long term evolution.

7. The method of claim 6, further comprising receiving system information for the first RAT and the second RAT over the first downlink carrier.

8. The method of claim 6, further comprising performing handover to one or more evolved Node Bs based at least in part on the first downlink carrier.

9. The method of claim 8, wherein the performing the handover comprises receiving handover information over the first downlink carrier.

10. The method of claim 8, wherein the performing the handover comprises measuring channel quality over the first downlink carrier.

11. The method of claim 8, further comprising requesting access over a random access channel of the first RAT using the uplink carrier corresponding to the first downlink carrier.

12. The method of claim 1, wherein the first cell corresponds to a primary cell and the second cell corresponds to a secondary cell.

13. An apparatus for communicating control information in a carrier aggregation configuration, comprising:

means for receiving, at a user equipment (UE) from a first cell, a first resource assignment for a first downlink carrier of a first radio access technology (RAT) and receiving, at the UE from a second cell different than the first cell, a second resource assignment for a second downlink carrier of a second RAT, wherein the first downlink carrier and the second downlink carrier are aggregated for communicating data in a wireless network;

means for determining, by the UE, resources for communicating first RAT control data for the first RAT over an uplink carrier corresponding to the first downlink carrier based at least in part on the first resource assignment;

means for determining, by the UE, a first processing time corresponding to the first RAT, that is different from a second processing time defined by the second RAT, by selecting the first processing time from a plurality of processing times based at least in part on channel characteristics related to a channel of the second RAT, wherein the first processing time is for communicating the second RAT control data over a portion of the resources for communicating the first RAT control data, and wherein the first processing time is configured to minimize a time difference to the second processing time defined by the second RAT; and means for communicating, by the UE, second RAT control data using a control channel of the uplink carrier of the first RAT over at least the portion of the resources for communicating the first RAT control data based only on the first processing time, wherein communicating includes adapting the second RAT control data for transmitting on the control channel of the first RAT.

14. The apparatus of claim 13, wherein the means for determining determines the first processing time as a fixed time offset between a first RAT processing time of the first RAT and the second processing time of the second RAT.

15. The apparatus of claim 13, wherein the first RAT comprises long term evolution.

16. The apparatus of claim 15, further comprising means for performing handover to one or more evolved Node Bs based at least in part on the first downlink carrier.

17. The apparatus of claim 16, further comprising means for receiving system information for the first RAT and the second RAT over the first downlink carrier, wherein the performing the handover comprises receiving handover information or measuring channel quality over the first downlink carrier.

18. The apparatus of claim 15, further comprising means for requesting service over a random access channel of the first RAT using the uplink carrier corresponding to the first downlink carrier.

19. A non-transitory computer-readable medium for communicating control information in a carrier aggregation configuration, comprising:

code for receiving, at a user equipment (UE) from a first cell, a first resource assignment for a first downlink carrier of a first radio access technology (RAT);

code for receiving, at the UE from a second cell different than the first cell, a second resource assignment for a second downlink carrier of a second RAT, wherein the first downlink carrier and the second downlink carrier are aggregated for communicating data in a wireless network;

code for determining, by the UE, resources for communicating first RAT control data for the first RAT over an uplink carrier corresponding to the first downlink carrier based at least in part on the first resource assignment;

code for determining, by the UE, a first processing time corresponding to the first RAT, that is different from a second processing time defined by the second RAT, by selecting the first processing time from a plurality of processing times based at least in part on channel characteristics related to a channel of the second RAT, wherein the first processing time is for communicating the second RAT control data over a portion of the resources for communicating the first RAT control data, and wherein the first processing time is configured to minimize a time difference to the second processing time defined by the second RAT; and code for communicating, by the UE, second RAT control data using a control channel of the uplink carrier of the first RAT over at least the portion of the resources for communicating the first RAT control data based only on the first processing time,
wherein the code for communicating includes code for adapting the second RAT control data for transmitting on the control channel of the first RAT.

20. The computer-readable medium of claim 19, wherein the code for determining the first processing time determines the first processing time as a fixed time offset between a first RAT processing time of the first RAT and the second processing time of the second RAT.

21. The computer-readable medium of claim 19, wherein the first RAT comprises long term evolution.

22. The computer-readable medium of claim 21, further comprising code for performing handover to one or more evolved Node Bs based at least in part on the first downlink carrier.

23. The computer-readable medium of claim 22, further comprising code for receiving system information for the first RAT and the second RAT over the first downlink carrier, wherein the code for performing the handover receives handover information or measures channel quality over the first downlink carrier based on the system information.

24. The computer-readable medium of claim 21, further comprising code for requesting service over a random access channel of the first RAT using the uplink carrier corresponding to the first downlink carrier.

25. An apparatus for communicating control information in a carrier aggregation configuration, comprising:
a processor;
a memory in electronic communication with the processor;
instructions stored in the memory, the instructions being executable by the processor to:
receive, at a user equipment (UE) from a first cell, a first resource assignment for a first downlink carrier of a first radio access technology (RAT);
receive, by the UE from a second cell different than the first cell, a second resource assignment for a second downlink carrier of a second RAT, wherein the first downlink carrier and the second downlink carrier are aggregated for communicating data in a wireless network;
determine, by the UE, resources for communicating first RAT control data for the first RAT over an uplink carrier corresponding to the first downlink carrier based at least in part on the first resource assignment;
determine, by the UE, a first processing time corresponding to the first RAT, that is different from a second processing time defined by the second RAT, by selecting the first processing time from a plurality of processing times based at least in part on channel characteristics related to a channel of the second RAT, wherein the first processing time is for communicating the second RAT control data over a portion of the resources for communicating the first RAT control data, and wherein the first processing time is configured to minimize a time difference to the second processing time defined by the second RAT; and
communicate, by the UE, second RAT control data using a control channel of the uplink carrier of the first RAT over at least the portion of the resources for communicating the first RAT control data based only on the first processing time,
wherein communicating includes adapting the second RAT control data for transmitting on the control channel of the first RAT.

26. The apparatus of claim 25, wherein the instructions being further executable by the processor to determine the first processing time as a fixed time offset between a first RAT processing time of the first RAT and the second processing time of the second RAT.

27. The apparatus of claim 25, wherein the first RAT comprises long term evolution.

28. The apparatus of claim 27, wherein the instructions being further executable by the processor to perform handover to one or more evolved Node Bs based at least in part on the first downlink carrier.

29. The apparatus of claim 28, wherein the instructions being further executable by the processor to:
receive system information for the first RAT and the second RAT over the first downlink carrier; and
perform the handover receives handover information or measures channel quality over the first downlink carrier based on the system information.

30. The apparatus of claim 27, wherein the instructions being further executable by the processor to request service over a random access channel of the first RAT using the uplink carrier corresponding to the first downlink carrier.

31. An apparatus for communicating control information in a carrier aggregation configuration, comprising:
a carrier assignment receiving component including a processor and a memory configured to receive, at a user equipment (UE) from a first cell, a first resource assignment for a first downlink carrier of a first radio access technology (RAT) and receiving, at the UE from a second cell different than the first cell, a second resource assignment for a second downlink carrier of a second RAT, wherein the first downlink carrier and the second downlink carrier are aggregated for communicating data in a wireless network;
a control resource determining component including the processor and the memory configured to determine, by the UE, resources for communicating first RAT control data for the first RAT over an uplink carrier corresponding to the first downlink carrier based at least in part on the first resource assignment;
wherein the control resource determining component determines, by the UE, a first processing time corresponding to the first RAT, that is different from a second processing time defined by the second RAT, by selecting the first processing time from a plurality of processing times based at least in part on channel characteristics related to a channel of the second RAT, wherein the first processing time is for communicating the second RAT control data over a portion of the resources for communicating the first RAT control data, and wherein the first processing time is configured to minimize a time difference to the second processing time defined by the second RAT; and
a control data communicating component including the processor and the memory configured to communicate, by the UE, second RAT control data using a control channel of the uplink carrier of the first RAT over at least the portion of the resources for communicating the first RAT control data based only on the first processing time,
wherein communicating includes adapting the second RAT control data for transmitting on the control channel of the first RAT.

32. The apparatus of claim 31, wherein the first RAT comprises long term evolution, the second RAT comprises high speed packet access, and the first processing time is selected to be either 7 slots or 8.5 slots of the first RAT.

33. The apparatus of claim 31, wherein the control resource determining component determines the first processing time as a fixed timing offset between a first RAT processing time of the first RAT and the second processing time of the second RAT.

34. The apparatus of claim 31, wherein the first RAT comprises long term evolution, the second RAT comprises high speed packet access, and the first processing time is 3 milliseconds.

35. The apparatus of claim 31, wherein the control data communicating component communicates the second RAT control data over the resources using a transmission periodicity and a reporting offset related to the first RAT.

36. The apparatus of claim 31, wherein the first RAT comprises long term evolution.

37. The apparatus of claim 36, further comprising a system information receiving component including the processor and the memory configured to receive system information for the first RAT and the second RAT over the first downlink carrier.

38. The apparatus of claim 36, further comprising a handover component including the processor and the memory configured to perform handover to one or more evolved Node Bs based at least in part on the first downlink carrier.

39. The apparatus of claim 38, wherein the handover component performs the handover based in part on receiving handover information over the first downlink carrier.

40. The apparatus of claim 38, wherein the handover component performs the handover based in part on measuring channel quality over the first downlink carrier.

41. The apparatus of claim 36, further comprising a random access generating component including the processor and the memory configured to request access over a random access channel of the first RAT using the uplink carrier corresponding to the first downlink carrier.

42. A method for assigning carriers to one or more devices in a wireless network, comprising:
assigning, by a network component, a first set of resources for a first downlink carrier of a first radio access technology (RAT) to a user equipment (UE) from a first cell;
assigning, by the network component, a second set of resources for a second downlink carrier of a second RAT to the UE from a second cell different than the first cell; and
receiving, at the network component, control data for the second set of resources over a control channel of an uplink carrier corresponding to the first downlink carrier over resources of the uplink carrier assigned for communicating control data of the first RAT based on a first transmission time corresponding to the first RAT determined by the UE, and that is different from a second transmission time defined by the second RAT, by selecting the first transmission time from a plurality of processing times based at least in part on channel characteristics related to a channel of the second RAT, wherein the control data for the second set of resources is communicated over the resources for communicating the control data of the first RAT based only on the first transmission time, and wherein the first processing time is configured to minimize a time difference to the second processing time defined by the second RAT, and
wherein the control data for the second set of resources is adapted for transmission on the control channel of the first RAT.

43. The method of claim 42, further comprising communicating the control data to a cell providing the second set of resources.

44. The method of claim 42, wherein the first RAT is long term evolution.

45. The method of claim 42, further comprising transmitting system information for the first RAT and the second RAT over the first downlink carrier.

46. The method of claim 45, further comprising performing handover for the UE to one or more eNBs over the first downlink carrier.

47. The method of claim 45, further comprising advertising a random access channel on the first downlink carrier.

48. An apparatus for assigning carriers to one or more devices in a wireless network, comprising:
means for assigning, by a network component, a first set of resources for a first downlink carrier of a first radio access technology (RAT) to a user equipment (UE) from a first cell and assigning, by the network component, a second set of resources for a second downlink carrier of a second RAT to the UE from a second cell different than the first cell; and
means for receiving, at the network component, control data for the second set of resources over a control channel of an uplink carrier corresponding to the first downlink carrier over resources of the uplink carrier assigned for communicating control data of the first RAT based on a first transmission time corresponding to the first RAT determined by the UE, and that is different from a second transmission time defined by the second RAT, by selecting the first transmission time from a plurality of processing times based at least in part on channel characteristics related to a channel of the second RAT, wherein the control data for the second set of resources is communicated over the resources for communicating the control data of the first RAT based only on the first transmission time, and wherein the first processing time is configured to minimize a time difference to the second processing time defined by the second RAT, and
wherein the control data for the second set of resources is adapted for transmission on the control channel of the first RAT.

49. The apparatus of claim 48, further comprising means for decoding the control data for the second RAT or communicating the control data to a cell providing the second set of resources.

50. A non-transitory computer-readable medium for assigning carriers to one or more devices in a wireless network, comprising:
code for causing at least one computer to assign, by a network component, a first set of resources for a first downlink carrier of a first radio access technology (RAT) to a user equipment (UE) from a first cell;
code for causing the at least one computer to assign, by the network component, a second set of resources for a second downlink carrier of a second RAT to the UE from a second cell different than the first cell; and
code for causing the at least one computer to receive, at the network component, control data for the second set of resources over a control channel of an uplink carrier corresponding to the first downlink carrier over resources of the uplink carrier assigned for communicating control data of the first RAT based on a first transmission time corresponding to the first RAT determined by the UE, and that is different from a second transmission time defined by the second RAT, by selecting the first transmission time from a plurality of processing times based at least in part on channel characteristics related to a channel of the second RAT, wherein the control data for the second set of resources over the resources for communicating the control data of the first RAT based only on the first transmission time, and wherein the first processing time is configured to minimize a time difference to the second processing time defined by the second RAT, and wherein the control data for the second set of resources is adapted for transmission on the control channel of the first RAT.

51. The computer-readable medium of claim 50, further comprising code for decoding the control data for the second RAT or communicate the control data to a cell providing the second set of resources.

52. An apparatus for assigning carriers to one or more devices in a wireless network, comprising:
a processor;
memory in electronic communication with the processor;
instructions stored in the memory, the instructions being executable by the processor to:
assign, by a network component, a first set of resources for a first downlink carrier of a first radio access technology (RAT) to a user equipment (UE) from a first cell;
assign, by the network component, a second set of resources for a second downlink carrier of a second RAT to the UE from a second cell different than the first cell; and
receive, at the network component, control data for the second set of resources over a control channel of an uplink carrier corresponding to the first downlink carrier over resources of the uplink carrier assigned for communicating control data of the first RAT based on a first transmission time corresponding to the first RAT determined by the UE, and that is different from a second transmission time defined by the second RAT, by selecting the first transmission time from a plurality of processing times based at least in part on channel characteristics related to a channel of the second RAT, wherein the control data for the second set of resources over the resources for communicating the control data of the first RAT based only on the first transmission time, and wherein the first processing time is configured to minimize a time difference to the second processing time defined by the second RAT, and
wherein the control data for the second set of resources is adapted for transmission on the control channel of the first RAT.

53. The apparatus of claim 52, wherein the instructions being further executable by the processor to decode the control data for the second RAT or communicate the control data to a cell providing the second set of resources.

54. An apparatus for assigning carriers to one or more devices in a wireless network, comprising:
a carrier assigning component including a processor and a memory configured to assign, by a network component, a first set of resources for a first downlink carrier of a first radio access technology (RAT) to a user equipment (UE) from a first cell and assigning, by the network component, a second set of resources for a second downlink carrier of a second RAT to the UE from a second cell different than the first cell; and
a control data receiving component including the processor and the memory configured to receive, at the network component, control data for the second set of resources over a control channel of an uplink carrier corresponding to the first downlink carrier over resources of the uplink carrier assigned for communicating control data of the first RAT based on a first transmission time corresponding to the first RAT determined by the UE, and that is different from a second transmission time defined by the second RAT, by selecting the first transmission time from a plurality of processing times based at least in part on channel characteristics related to a channel of the second RAT, wherein the control data for the second set of resources over the resources for communicating the control data of the first RAT based only on the first transmission time, and wherein the first processing time is configured to minimize a time difference to the second processing time defined by the second RAT, and
wherein the control data for the second set of resources is adapted for transmission on the control channel of the first RAT.

55. The apparatus of claim 54, further comprising a control data processing component including the processor and the memory configured to decode the control data for the second RAT or communicating the control data to a cell providing the second set of resources.

56. The apparatus of claim 54, wherein the first RAT is long term evolution.

57. The apparatus of claim 54, further comprising a system information communicating component including the processor and the memory configured to transmit system information for the first RAT and the second RAT over the first downlink carrier.

58. The apparatus of claim 57, further comprising a handover component including the processor and the memory configured to perform handover for the UE to one or more eNBs over the first downlink carrier.

59. The apparatus of claim 57, further comprising a random access parameter broadcasting component including the processor and the memory configured to advertise a random access channel on the first downlink carrier.

* * * * *